(12) United States Patent
Tang et al.

(10) Patent No.: US 11,287,662 B2
(45) Date of Patent: *Mar. 29, 2022

(54) IMAGING LENS ASSEMBLY, CAMERA MODULE AND ELECTRONIC DEVICE

(71) Applicant: LARGAN PRECISION CO., LTD., Taichung (TW)

(72) Inventors: Hsiang-Chi Tang, Taichung (TW); Cheng-Chen Lin, Taichung (TW); Ming-Ta Chou, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/153,955

(22) Filed: Jan. 21, 2021

(65) Prior Publication Data
US 2021/0141234 A1    May 13, 2021

Related U.S. Application Data

(63) Continuation of application No. 16/708,506, filed on Dec. 10, 2019, now Pat. No. 10,935,801, which is a
(Continued)

(30) Foreign Application Priority Data

Jul. 19, 2017    (TW) ................................ 106124173

(51) Int. Cl.
G02B 27/09    (2006.01)
G02B 9/34    (2006.01)
(Continued)

(52) U.S. Cl.
CPC ......... *G02B 27/0955* (2013.01); *G02B 7/021* (2013.01); *G02B 7/022* (2013.01);
(Continued)

(58) Field of Classification Search
CPC .... G02B 27/0955; G02B 7/021; G02B 7/022; G02B 9/34; G02B 9/60; G02B 13/0045; H04N 5/2254
See application file for complete search history.

(56) References Cited

U.S. PATENT DOCUMENTS 4,886,342 A    12/1989 Kudo et al.
7,457,052 B2    11/2008 Hirata
(Continued)

*Primary Examiner* — Antoinette T Spinks
(74) *Attorney, Agent, or Firm* — McClure, Qualey & Rodack, LLP

(57) ABSTRACT

An imaging lens assembly includes a plastic barrel and an imaging lens set. The plastic barrel includes an object-side aperture and a first annular surface. The imaging lens set includes a plurality of optical elements, wherein at least one of the optical elements is a plastic lens element, and the plastic lens element includes an effective optical portion, a peripheral portion, a second annular surface, and an object-side connecting surface. The peripheral portion is formed around the effective optical portion. The second annular surface is formed on an object-side surface of the plastic lens element and surrounds the effective optical portion. The object-side connecting surface is formed on the object-side surface of the plastic lens element and surrounds the effective optical portion, and the object-side connecting surface is connected with one of the optical elements disposed on an object side of the plastic lens element.

14 Claims, 27 Drawing Sheets

Related U.S. Application Data continuation of application No. 15/922,037, filed on Mar. 15, 2018, now Pat. No. 10,539,804.

(51) Int. Cl.
  *H04N 5/225* (2006.01)
  *G02B 7/02* (2021.01)
  *G02B 13/00* (2006.01)
  *G02B 9/60* (2006.01)

(52) U.S. Cl.
  CPC ............... *G02B 9/34* (2013.01); *G02B 9/60* (2013.01); *G02B 13/0045* (2013.01); *H04N 5/2254* (2013.01)

(56) References Cited

U.S. PATENT DOCUMENTS

| | | |
|---|---|---|
| 8,824,066 B2 | 9/2014 | Weng |
| 9,891,411 B2 | 2/2018 | Lai et al. |
| 10,205,863 B2 | 2/2019 | Tsai et al. |
| 2003/0189769 A1 | 10/2003 | Anderson |
| 2008/0095528 A1 | 4/2008 | Jao et al. |
| 2017/0108627 A1 | 4/2017 | Chou et al. |
| 2018/0164545 A1 | 6/2018 | Chou |
| 2019/0018171 A1 | 1/2019 | Chang et al. |
| 2019/0025600 A1 | 1/2019 | Tang et al. |
| 2019/0033497 A1 | 1/2019 | Chou |
| 2019/0049689 A1 | 2/2019 | Lin et al. |

IMAGING LENS ASSEMBLY, CAMERA MODULE AND ELECTRONIC DEVICE

RELATED APPLICATIONS

The present application is a continuation of U.S. application Ser. No. 16/708,506, filed Dec. 10, 2019, now U.S. Pat. No. 10,935,801, which is a continuation of U.S. application Ser. No. 15/922,037, filed Mar. 15, 2018, now U.S. Pat. No. 10,539,804 issued on Jan. 21, 2020, which claims priority to Taiwan Application Serial Number 106124173, filed Jul. 19, 2017, which are herein incorporated by references.

BACKGROUND

Technical Field

The present disclosure relates to an imaging lens assembly and a camera module. More particularly, the present disclosure relates to an imaging lens assembly and a camera module applied to portable electronic devices.

Description of Related Art

For lens assemblies applied to portable electronic devices, in addition to the lens elements for image formation, the lens assemblies further include optical elements, such as light blocking sheets, spacers and fixing rings, for maintaining a proper optical distance between lens elements or for positioning all of the lens elements within a plastic barrel thereto. However, because of the size relation between the lens elements and the optical elements, it is easy to damage the lens elements and optical elements indirectly by the compression force applied externally during the assembling process of the lens assemblies, so that the lens elements and optical elements cannot recover to the conditions before being forced.

For example, FIG. 8A is a schematic view of a conventional imaging lens assembly 80, FIG. 8B is a schematic view of a light blocking sheet 81 of the imaging lens assembly 80 of FIG. 8A, and FIG. 8C is a schematic view of a spacer 82 of the imaging lens assembly 80 of FIG. 8A. As shown in FIG. 8A, after the optical elements are sequentially arranged in a barrel 89 of the imaging lens assembly 80, a fixing ring 83 is disposed on an image side of the imaging lens assembly 80, and then a compression force is applied to the fixing ring 83 at a position indicated by an arrow A. Since an opening of the fixing ring 83 is larger than the outer diameters of other optical elements, the forcing points of other optical elements are closer to an outer diameter surface in a peripheral region thereof, which is indicated by an arrow B. As shown in FIG. 8B, a stressing line 811 is generated after the light blocking sheet 81 being forced, and it is indicated that the light blocking sheet 81 is damaged and cannot recover to the condition before being forced. As shown in FIG. 8C, a flexure 821 is generated after the spacer 82 being forced, and it damages not only the flexure 821 itself but also affects other adjacent optical elements to have problems of flexural deformation so as to affect a shape of an optical effective portion thereof, so that the imaging quality of the of the imaging lens assembly 80 will be decreased. Because the spacer 82 is generally made of a PC material which has a hardness being soft (compared to the pencil hardness), it is unrecoverable after flexure formation of the spacer 82. Furthermore, if the material of the spacer 82 is replaced with a harder material, the manufacturing cost is too high, and the spacer 82 is difficult to form during the injection molding process.

Therefore, in conventional imaging lens assemblies, the size problem of the optical elements will directly decrease the manufacturing efficiency and affect the imaging quality, so that it has become an important issue needs to be resolved eagerly in the relative field.

SUMMARY

The present disclosure provides an imaging lens assembly including a plastic barrel and an imaging lens set. The plastic barrel includes an object-side aperture and a first annular surface. The first annular surface is formed in the plastic barrel and surrounds the object-side aperture. The imaging lens set is disposed in the plastic barrel and has an optical axis, and the imaging lens set includes a plurality of optical elements, wherein at least one of the optical elements is a plastic lens element, and the plastic lens element includes an effective optical portion, a peripheral portion, a second annular surface and an object-side connecting surface. The peripheral portion is formed around the effective optical portion. The second annular surface is formed on an object-side surface of the plastic lens element and surrounds the effective optical portion. The object-side connecting surface is formed on the object-side surface of the plastic lens element and surrounds the effective optical portion, and the object-side connecting surface is connected with one of the optical elements disposed on an object side of the plastic lens element, wherein the object-side connecting surface is closer to the effective optical portion than the second annular surface thereto. Wherein, the first annular surface and the second annular surface are parallel to each other, both of the first annular surface and the second annular surface are perpendicular to the optical axis, and there is without additional one or more optical elements inserted between the first annular surface and the second annular surface. Wherein, the object-side connecting surface is disposed on an object side of the first annular surface, a distance parallel to the optical axis between the object-side connecting surface and the first annular surface is AT1, and the following condition is satisfied:

$$-0.40 \text{ mm} < AT1 < 0 \text{ mm}.$$

According to another aspect of the present disclosure, a camera module includes the imaging lens assembly according to the aforementioned aspect.

According to another aspect of the present disclosure, an electronic device includes the camera module according to the aforementioned aspect and an image sensor disposed on an image surface of the camera module.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1A:
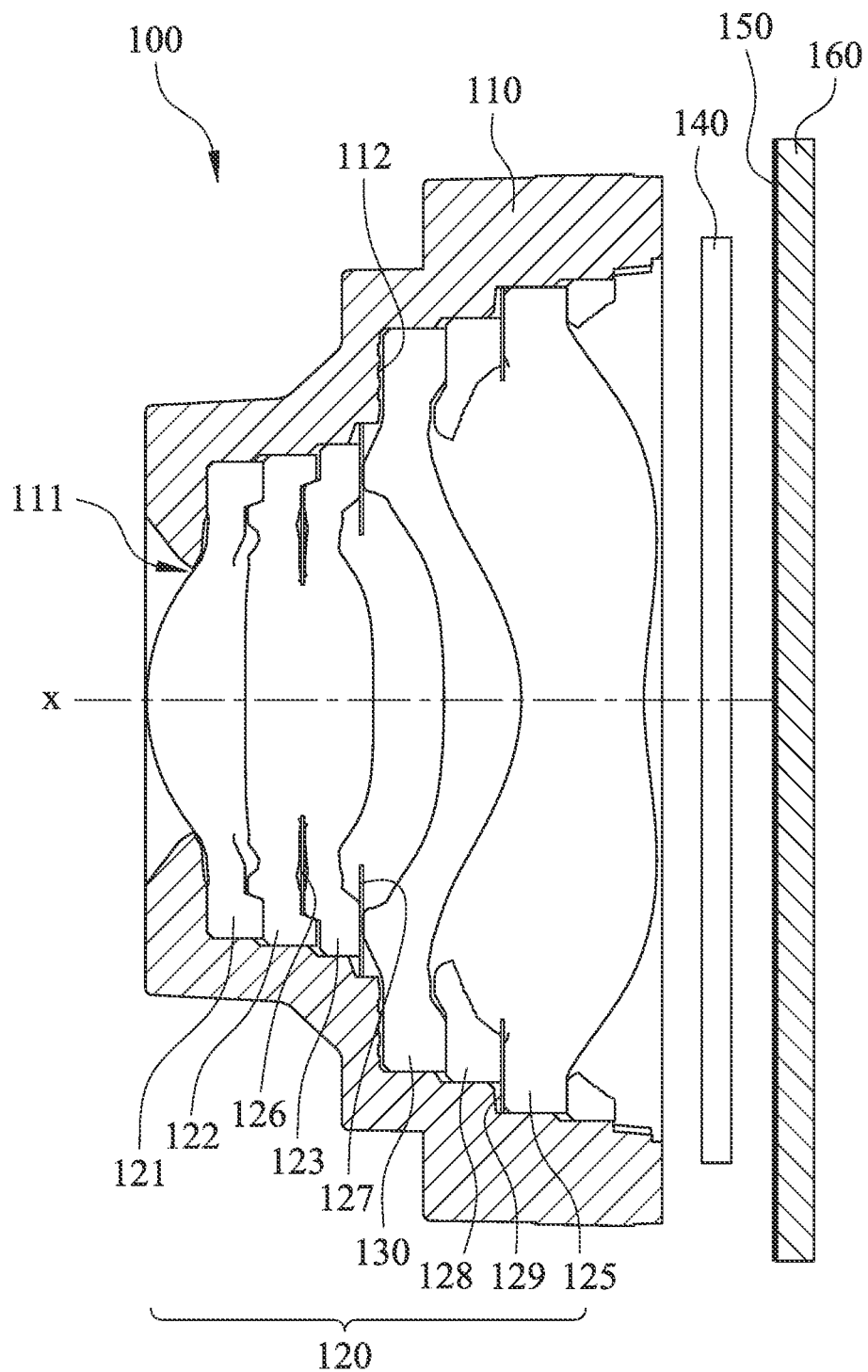
FIG. 1A is a schematic view of a camera module according to the 1st embodiment of the present disclosure.

An imaging lens assembly includes a plastic barrel and an imaging lens set, wherein the imaging lens set is disposed in the plastic barrel and has an optical axis, and the imaging lens set includes a plurality of optical elements.

In detail, the plastic barrel includes an object-side aperture and a first annular surface, wherein the first annular surface is formed in the plastic barrel and surrounds the object-side aperture. In particular, "the first annular surface surrounds the object-side aperture" means that the first annular surface surrounds the object-side aperture while looking from an image side of the plastic barrel toward the object-side aperture on an object side thereof, that is, the first annular surface is disposed on an inner surface of the plastic barrel.

At least one of the optical elements of the imaging lens set is a plastic lens element. The plastic lens element has an object-side surface and an image-side surface, and includes an effective optical portion, a peripheral portion, a second annular surface and an object-side connecting surface. The peripheral portion is formed around the effective optical portion. The second annular surface is formed on the object-side surface of the plastic lens element and surrounds the effective optical portion. The object-side connecting surface is formed on the object-side surface of the plastic lens element and surrounds the effective optical portion, and the object-side connecting surface is connected with one of the optical elements disposed on the object side of the plastic lens element. The second annular surface and the object-side connecting surface are both disposed on the peripheral portion, and the object-side connecting surface is closer to the effective optical portion than the second annular surface thereto. The first annular surface and the second annular surface are parallel to each other, both of the first annular surface and the second annular surface are perpendicular to the optical axis, and there is without additional one or more optical elements inserted between the first annular surface and the second annular surface. The object-side connecting surface is disposed on an object side of the first annular surface, when a distance parallel to the optical axis between the object-side connecting surface and the first annular surface is AT1 (the first annular surface is defined as a reference surface, and a distance parallel to the optical axis between the object-side connecting surface disposed on an object side of the reference surface and the reference surface is a negative value), the following condition is satisfied: −0.40 mm<AT1<0 mm. Therefore, the appearance of the plastic lens element can be more stereoscopic, which is different from conventional lens elements with flatter appearance, and the supporting intensity of the plastic lens element itself can be reinforced. Moreover, the compression force applied during the assembling process of the imaging lens assembly can be moderated by the arrangement of the first annular surface and the second annular surface so as to reduce the flexural level of the plastic lens element effectively.

An air space can be disposed between the first annular surface and the second annular surface. Therefore, the increasing of the assembling tolerance of the imaging lens assembly resulted from the first annular surface leaning on the plastic lens element can be avoided.

When a length of the air space between the first annular surface and the second annular surface is d, the following condition can be satisfied: 0.001 mm<d<0.08 mm. Therefore, a smaller space between the plastic lens element and the plastic barrel can be obtained, so that the first annular surface can provide a supporting force to the plastic lens element immediately before the plastic lens element is over-bending so as to protect the plastic lens element.

The plastic lens element can further include an image-side connecting surface, and the image-side connecting surface is formed on an image-side surface of the plastic lens element and surrounds the effective optical portion, that is, the image-side connecting surface is disposed on the peripheral portion. The image-side connecting surface is connected with another of the optical elements disposed on the image side of the plastic lens element. When the distance parallel to the optical axis between the object-side connecting surface and the first annular surface is AT1, and a distance parallel to the optical axis between the image-side connecting surface and the first annular surface is AT2 (the first annular surface is defined as the reference surface, and a distance parallel to the optical axis between the image-side connecting surface disposed on an image side of the reference surface and the reference surface is a positive value), the following condition can be satisfied: −0.60<AT1/AT2<0.0. Therefore, the appearance of the plastic lens element can be maintained, and a large height difference between the object-side connecting surface and the image-side connecting surface can be prevented so as to reduce the manufacturing difficulty.

Furthermore, when the distance parallel to the optical axis between the object-side connecting surface and the first annular surface is AT1, and the distance parallel to the optical axis between the image-side connecting surface and the first annular surface is AT2, the following condition can be satisfied: 2×|AT1|<AT2. Therefore, the structural intensity of the plastic lens element can be increased.

The object-side connecting surface and the image-side connecting surface can be parallel to each other, and both of the object-side connecting surface and the image-side connecting surface can be perpendicular to the optical axis. Therefore, a proper assembling position for other optical elements can be provided.

A mucilage material can be applied between the first annular surface and the second annular surface. Therefore, a material which can absorb the compression force can be provided so as to prevent the first annular surface from deformation by force.

At least one of the first annular surface and the second annular surface can be an annular stepped surface arranged along a direction perpendicular to the optical axis. Therefore, the moderating efficiency can be further enhanced by the disposition of the annular stepped surface. Furthermore, in addition to the disposition of the annular stepped surface, a mucilage material can be further applied between the first annular surface and the second annular surface. Because an applied range of the mucilage material can be effectively restricted by the annular stepped surface so as to avoid overflowing of the mucilage material, it is favorable for avoiding contaminating of the object-side connecting surface of the plastic lens element by the mucilage material, and therefore the assembling accuracy of the imaging lens assembly can be maintained.

When a central thickness of the plastic lens element is CT, and the distance parallel to the optical axis between the image-side connecting surface and the first annular surface is AT2, the following condition can be satisfied: 0.4<AT2/CT<2.0. Therefore, the thickness of the plastic lens element can be well-distributed, and it is favorable for avoiding the thickness of partial region of the plastic lens element being too thin and then affecting the fluency of the injection molding. More preferably, the following condition can be satisfied: 0.5<AT2/CT<1.6. Therefore, the flexural level of the plastic lens element can be further well-distributed so as to prevent the thinnest region of the plastic lens element from over bending.

When a length of the first annular surface perpendicular to the optical axis is S1, and a length of the second annular surface perpendicular to the optical axis is S2, the following condition can be satisfied: 70%<(S1/S2)×100%<200%. Therefore, a corresponding region of the first annular surface and the second annular surface is larger, and it is favorable for preventing the partial thickness of the plastic barrel from being too thick and increasing the size of the plastic barrel.

Each of the aforementioned features of the imaging lens assembly of the present disclosure can be utilized in numerous combinations, so as to achieve the corresponding functionality.

According to another aspect of the present disclosure, a camera module includes the imaging lens assembly according to the aforementioned aspect. In the camera module, the object-side aperture of the imaging lens assembly can be an aperture stop of the imaging lens set. Therefore, enough entry light of the camera module can be assured by the disposition of a front aperture stop, so that the demands for large aperture stop can be satisfied.

In the imaging lens set of the camera module, when a number of the plastic lens elements is N, a number of the plastic lens element having an outer diameter $\psi N1i$ is N1, and a number of the plastic lens element having an outer diameter $\psi N2j$ is N2, the following conditions are satisfied: $5 \leq N < 10$; $N = N1 + N2$; 2.8 mm$<\psi N1i<$3.8 mm, wherein i=1, 2, 3 . . . N−1; and 4.7 mm$<\psi N2j<$7.0 mm, wherein j=1, 2 . . . N−N1. Therefore, the outer diameter of a lens elements group having the number N1 of the imaging lens set and the outer diameter of a lens elements group having the number N2 of the imaging lens set can be significantly demarcated from each other, and each of the lens elements groups has a specific range, so that enlarging of the outer diameter of the lens elements group having the number N1 in order to accommodate to a lens elements group having larger outer diameters can be avoided. It is favorable for designing a proper first annular surface and a second annular surface of the plastic barrel and the plastic lens element so as to reduce the space waste and the size of the camera module.

According to another aspect of the present disclosure, an electronic device includes the camera module according to the aforementioned aspect and an image sensor, wherein the image sensor is disposed on an image surface of the camera module. Therefore, it is favorable for enhancing the manufacturing efficiency of the electronic device, and the demand for compact size of the electronic device can be achieved.

According to the above descriptions, the specific embodiments and reference drawings thereof are given below so as to describe the present disclosure in detail.

1st Embodiment

Figure 1B:
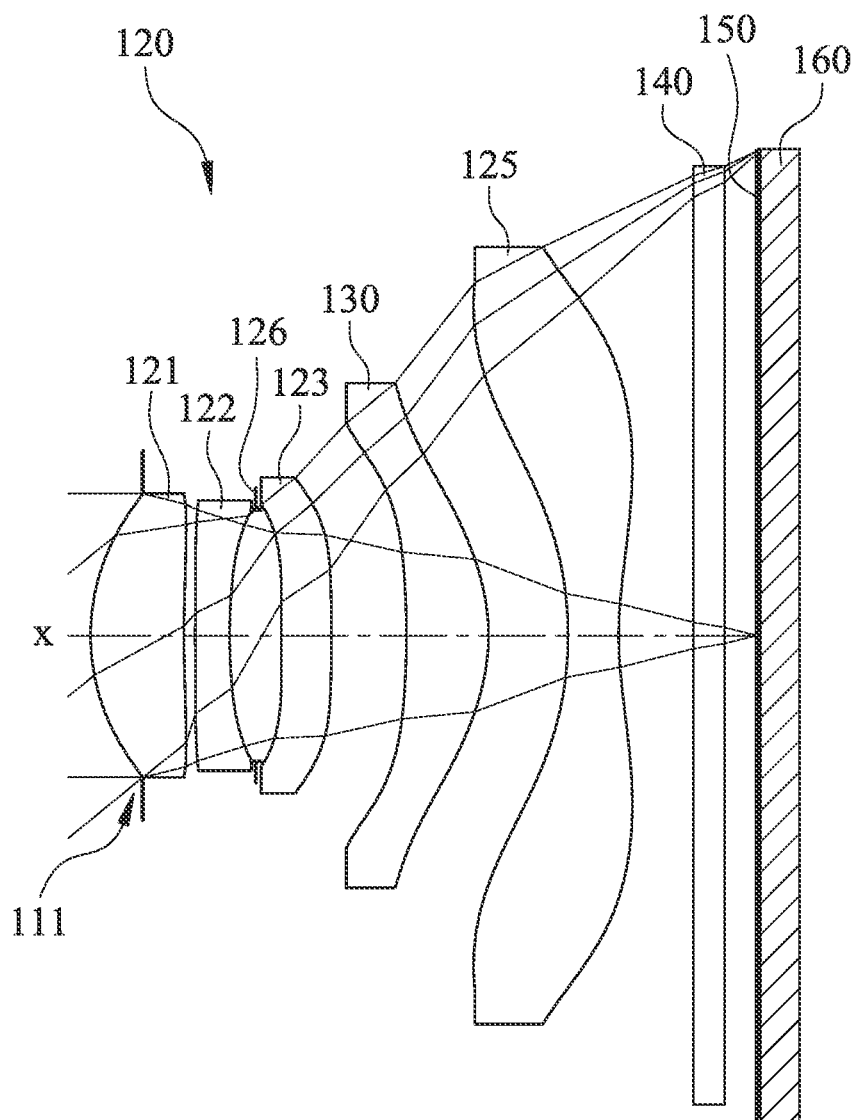
FIG. 1B is a schematic view of an imaging lens set of an imaging lens assembly of the camera module according to the 1st embodiment.

FIG. 1A is a schematic view of a camera module according to the 1st embodiment of the present disclosure. FIG. 1B is a schematic view of an imaging lens set 120 of an imaging lens assembly 100 of the camera module according to the 1st embodiment. As shown in FIG. 1A, the camera module includes, in order from an object side to an image side along an optical axis X, an imaging lens assembly 100, an IR-cut filter 140 and an image surface 150, wherein the image surface 150 is disposed on an image side of the imaging lens assembly 100, and the image sensor 160 is disposed on the image surface 150. The imaging lens assembly 100 includes a plastic barrel 110 and an imaging lens set 120, wherein the imaging lens set 120 is disposed in the plastic barrel 110.

In detail, the imaging lens set 120 has the optical axis X and includes a plurality of optical elements, and the optical elements are, in order from the object side to the image side, a first plastic lens element 121, a second plastic lens element 122, a stop 126, a third plastic lens element 123, a light blocking sheet 127, a fourth plastic lens element 130, a spacer 128, a light blocking sheet 129 and a fifth plastic lens element 125.

The plastic barrel 110 includes an object-side aperture 111 and a first annular surface 112, wherein the object-side aperture 111 is an aperture stop of the imaging lens set 120, and the first annular surface 112 is formed in the plastic barrel 110 and surrounds the object-side aperture 111.

Figure 1C:
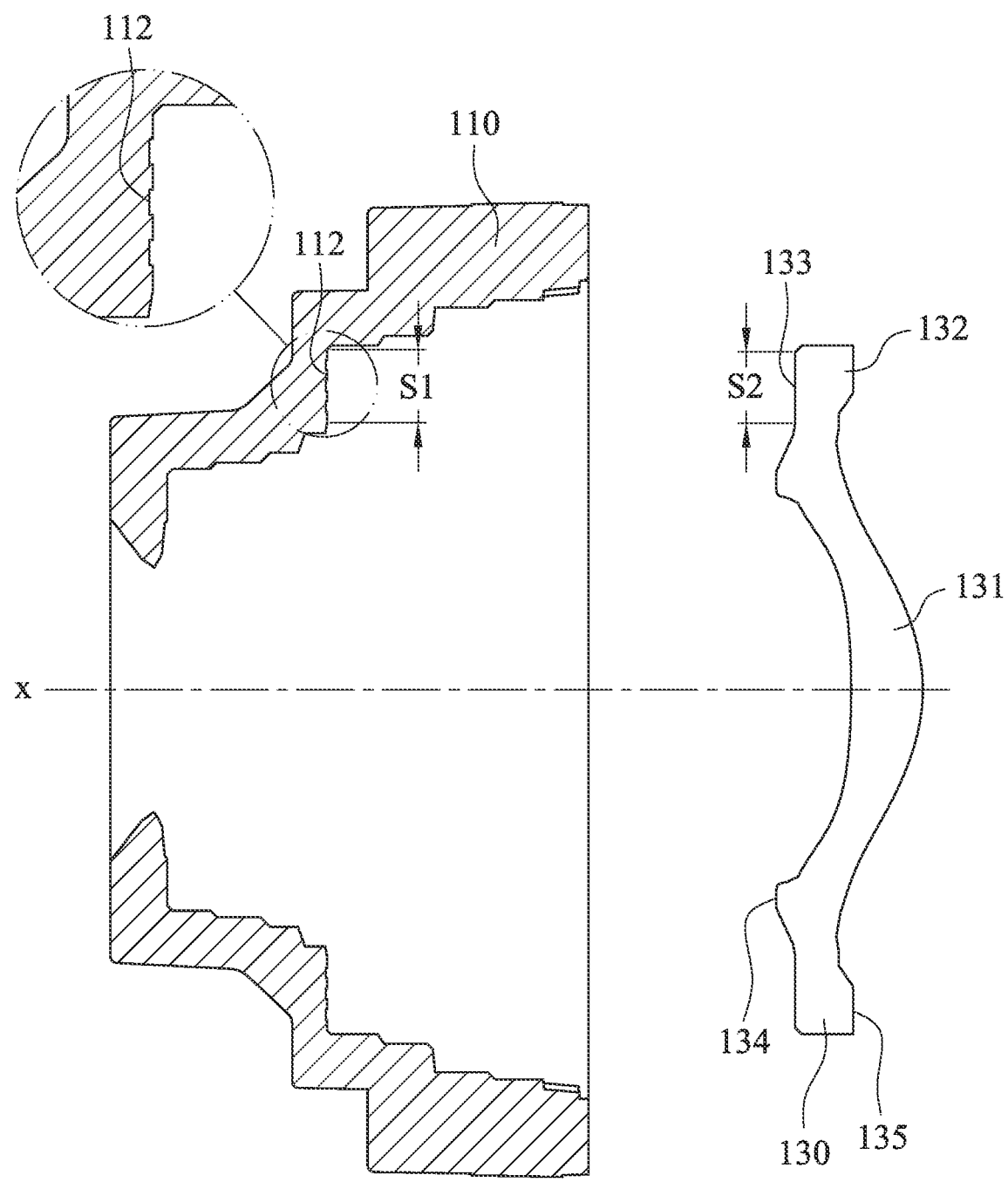
FIG. 1C is an exploded view of a plastic barrel and a fourth plastic lens element according to the 1st embodiment.
Figure 1D:
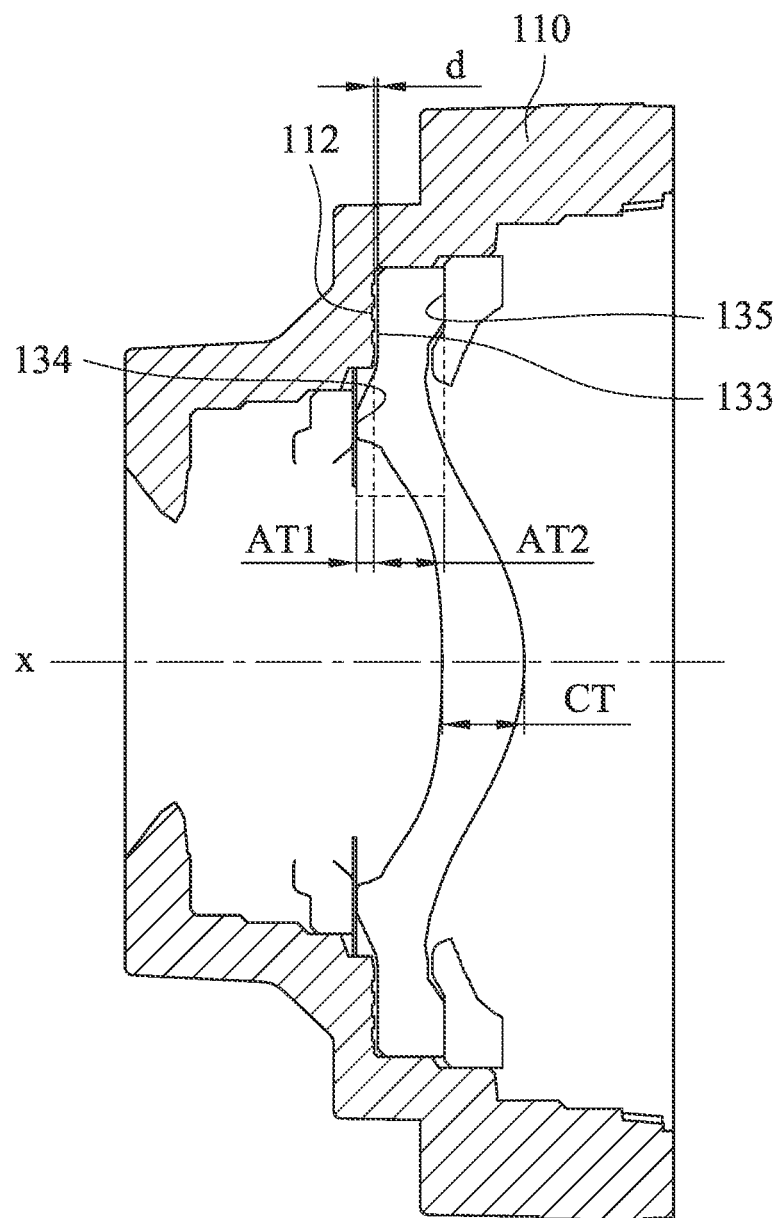
FIG. 1D is a schematic view of parameters of the 1st embodiment.

FIG. 1C is an exploded view of the plastic barrel 110 and the fourth plastic lens element 130 according to the 1st embodiment. FIG. 1D is a schematic view of parameters of the 1st embodiment. The fourth plastic lens element 130 includes an effective optical portion 131, a peripheral portion 132, a second annular surface 133, an object-side connecting surface 134 and an image-side connecting surface 135. The peripheral portion 132 is formed around the effective optical portion 131. The second annular surface 133 is formed on an object-side surface of the fourth plastic lens element 130 and surrounds the effective optical portion 131, that is, the second annular surface 133 is disposed on the peripheral portion 132. The object-side connecting surface 134 is formed on an object-side surface of the fourth plastic lens element 130 and surrounds the effective optical portion 131, and the object-side connecting surface 134 is connected with one of the optical elements disposed on an object side of the fourth plastic lens element 130 (that is, the light blocking sheet 127 of the 1st embodiment), wherein the object-side connecting surface 134 is closer to the effective optical portion 131 than the second annular surface 133 thereto. The image-side connecting surface 135 is formed on an image-side surface of the fourth plastic lens element 130 and surrounds the effective optical portion 131, and the image-side connecting surface 135 is connected with another of the optical elements disposed on an image side of the fourth plastic lens element 130 (that is, the spacer 128 of the 1st embodiment). The first annular surface 112 and the second annular surface 133 are parallel to each other, both of the first annular surface 112 and the second annular surface 133 are perpendicular to the optical axis X, and there is without additional one or more optical elements inserted between the first annular surface 112 and the second annular surface 133. The object-side connecting surface 134 and the image-side connecting surface 135 are parallel to each other, and both of the object-side connecting surface 134 and the image-side connecting surface 135 are perpendicular to the optical axis X.

As shown in FIG. 1D, the object-side connecting surface 134 is disposed on an object side of the first annular surface 112. When a distance parallel to the optical axis X between the object-side connecting surface 134 and the first annular surface 112 is AT1, the following the condition is satisfied: AT1=−0.117 mm. Therefore, the compression force applied during the assembling process of the imaging lens assembly can be supported by the appearance of the fourth plastic lens element 130, and no additional spacer is needed.

An air space is disposed between the first annular surface 112 and the second annular surface 133. When a length of the air space between the first annular surface 112 and the second annular surface 133 is d, the following condition is satisfied: d=0.028 mm. Therefore, the compressive bending of the fourth plastic lens element 130 during the assembling process can be supported by the first annular surface 112.

When the distance parallel to the optical axis X between the object-side connecting surface 134 and the first annular surface 112 is AT1, and a distance parallel to the optical axis X between the image-side connecting surface 135 and the first annular surface 112 is AT2, the following condition is satisfied: AT1/AT2=−0.247. Furthermore, in the 1st embodiment, when AT1=−0.117 mm, and AT2=0.473 mm, the following condition can be satisfied: 2×|AT1|<AT2.

At least one of the first annular surface 112 and the second annular surface 133 is an annular stepped surface arranged along a direction perpendicular to the optical axis X. In particular, as shown in FIG. 1C, the first annular surface 112 is an annular stepped surface arranged along the direction perpendicular to the optical axis X in the 1st embodiment.

As shown un FIG. 1D, when a central thickness of the fourth plastic lens element 130 is CT, and the distance parallel to the optical axis X between the image-side connecting surface 135 and the first annular surface 112 is AT2, the following condition is satisfied: AT2/CT=0.858.

A length of the first annular surface 112 perpendicular to the optical axis X is S1 (the aforementioned length is defined as a length perpendicular to the optical axis X of the first annular surface 112 on a cross-section surface of the imaging lens assembly 100, and the cross-section surface is shown by a cross-section line passing through the optical axis X), and a length of the second annular surface 133 perpendicular to the optical axis X is S2 (the aforementioned length is defined as a length perpendicular to optical axis X of the second annular surface 133 on a cross-section surface of the fourth plastic lens element 130, and the cross-section surface is shown by a cross-section line passing through the optical axis X). Furthermore, in the 1st embodiment, when S1=0.565 mm, and S2=0.55 mm, the following condition is satisfied: (S1/S2)×100%=102.7%.

Figure 1E:
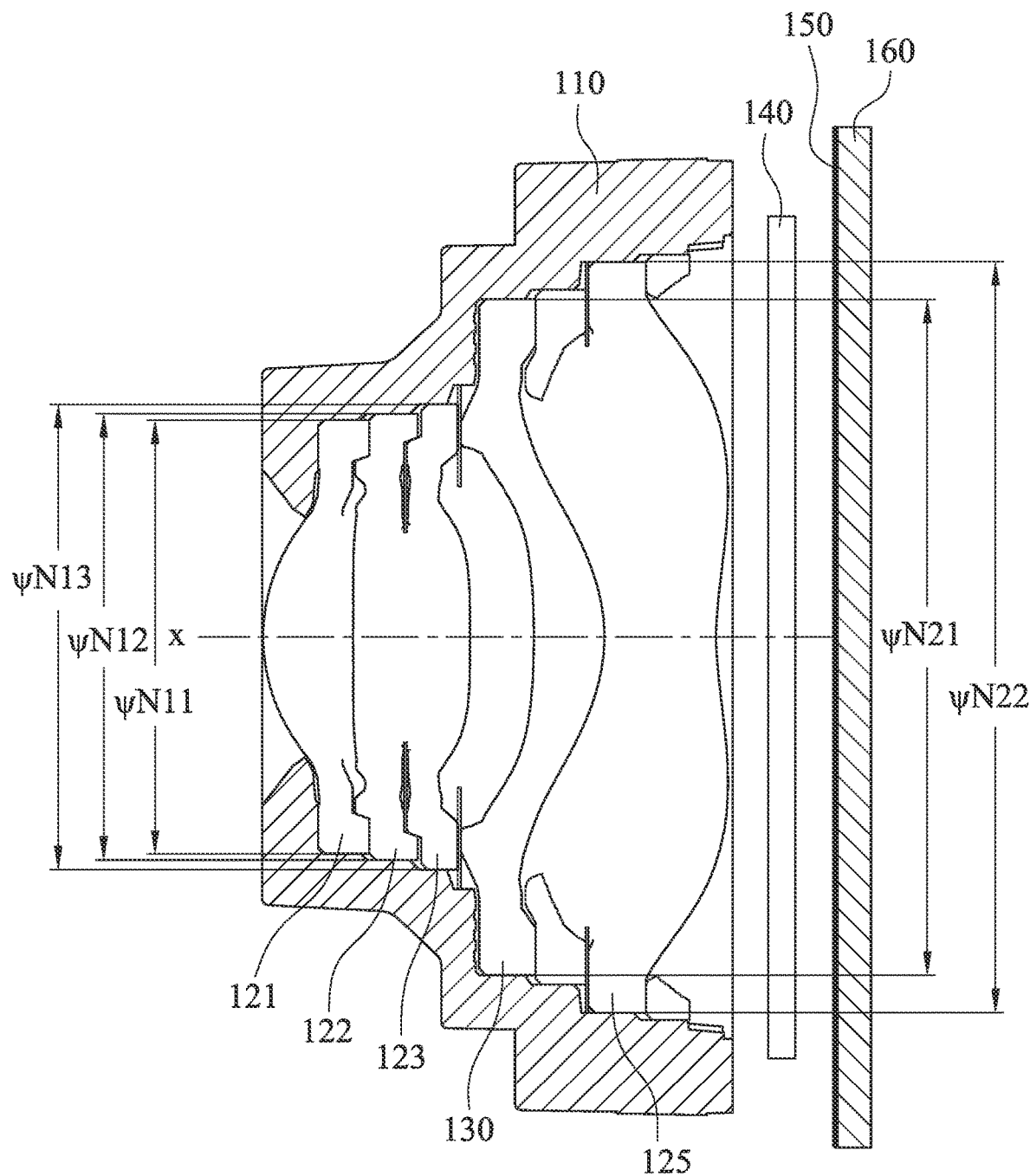
FIG. 1E is a schematic view of outer diameters of each of the plastic lens elements of the imaging lens set according to the 1st embodiment.

When a number of the plastic lens elements is N, a number of the plastic lens elements having an outer diameter ψN1i is N1, and a number of plastic lens elements having an outer diameter ψpN2j is N2, the following conditions are satisfied: 5≤N<10; N=N1+N2; 2.8 mm<ψN1i<3.8 mm, wherein i=1, 2, 3 . . . N−1; and 4.7 mm<ψN2j<7.0 mm, wherein j=1, 2 . . . N−N1. Please refer to FIG. 1E, which is a schematic view of outer diameters of each of the plastic lens elements of the imaging lens set 120 according to the 1st embodiment. As shown in FIG. 1E, in the 1st embodiment, N=5, N1=3 (those are, the first plastic lens element 121, the second plastic lens element 122 and the third plastic lens element 123), N2=2 (those are, the fourth plastic lens element 130 and the fifth plastic lens element 125), and the values of the outer diameters of each of the plastic lens elements are shown below.

| 1st Embodiment | | | | |
| --- | --- | --- | --- | --- |
| Plastic Lens Element | 121 ψN11 | 122 ψN12 | 123 ψN13 | 130 ψN21 | 125 ψN22 |
| Outer Diameter (mm) | 3.4 | 3.5 | 3.65 | 5.3 | 5.89 |

The detailed optical data of the 1st embodiment are shown in Table 1 and the aspheric surface data are shown in Table 2 below.

TABLE 1

1st embodiment
f = 3.90 mm, Fno = 2.05, HFOV = 39.3 deg.

| Surface # | | Curvature radius | | Thickness | Material | Index | Abbe # | Focal Length |
|---|---|---|---|---|---|---|---|---|
| 0 | Object | Plano | | Infinity | | | | |
| 1 | Ape. stop | Plano | | −0.351 | | | | |
| 2 | Lens 1 | 1.434 | ASP | 0.627 | Plastic | 1.545 | 56.1 | 3.18 |
| 3 | | 7.017 | ASP | 0.075 | | | | |
| 4 | Lens 2 | 11.905 | ASP | 0.230 | Plastic | 1.660 | 20.4 | −6.79 |
| 5 | | 3.230 | ASP | 0.176 | | | | |
| 6 | Stop | Plano | | 0.173 | | | | |
| 7 | Lens 3 | 25.368 | ASP | 0.334 | Plastic | 1.566 | 37.4 | 39.79 |
| 8 | | −200.000 | ASP | 0.504 | | | | |
| 9 | Lens 4 | −6.630 | ASP | 0.551 | Plastic | 1.544 | 56.0 | 3.08 |
| 10 | | −1.377 | ASP | 0.533 | | | | |
| 11 | Lens 5 | −2.599 | ASP | 0.340 | Plastic | 1.544 | 56.0 | −2.26 |
| 12 | | 2.444 | ASP | 0.500 | | | | |
| 13 | IR-cut filter | Plano | | 0.210 | Glass | 1.517 | 64.2 | — |
| 14 | | Plano | | 0.227 | | | | |
| 15 | Image Surface | Plano | | — | | | | |

Reference wavelength is 587.6 nm (d-line).
Effective radius of Surface 6 is 0.845 mm.

TABLE 2

Aspheric Coefficients

| Surface # | 2 | 3 | 4 | 5 | 7 |
|---|---|---|---|---|---|
| k = | −8.7708E−02 | −4.2074E+01 | 7.9293E+00 | −7.0051E+00 | 4.8844E+01 |
| A4 = | 4.2185E−03 | −1.6384E−01 | −2.6008E−01 | −9.3578E−02 | −2.2593E−01 |
| A6 = | −1.0722E−02 | 2.8299E−01 | 6.6482E−01 | 4.6345E−01 | −7.7557E−02 |
| A8 = | 1.0134E−01 | −2.0133E−01 | −6.7146E−01 | −4.0513E−01 | 3.1320E−01 |
| A10 = | −2.8109E−01 | −4.0737E−03 | 3.0151E−01 | 1.1650E−01 | −6.2329E−01 |
| A12 = | 3.3367E−01 | 7.7646E−03 | −4.2762E−02 | 1.0293E−01 | 3.7296E−01 |
| A14 = | −1.5900E−01 | | | | |

| Surface # | 8 | 9 | 10 | 11 | 12 |
|---|---|---|---|---|---|
| k = | −9.9000E+01 | −1.8680E+01 | −6.8670E+00 | −5.0992E+00 | −1.7750E+01 |
| A4 = | −1.9162E−01 | −5.7622E−02 | −1.9899E−01 | −1.0250E−01 | −7.4010E−02 |
| A6 = | 4.9255E−02 | −1.3742E−02 | 2.6722E−01 | 6.5106E−02 | 3.3794E−02 |
| A8 = | −2.6034E−01 | 5.1328E−03 | −2.6995E−01 | −2.1488E−02 | −1.1982E−02 |
| A10 = | 4.9982E−01 | −3.1514E−02 | 1.8174E−01 | 4.9743E−03 | 2.6579E−03 |
| A12 = | −5.0712E−01 | 2.7153E−02 | −6.9834E−02 | −7.6675E−04 | −3.7350E−04 |
| A14 = | 2.1081E−01 | −5.7762E−03 | 1.3950E−02 | 6.7745E−05 | 3.0931E−05 |
| A16 = | | | −1.1346E−03 | −2.5483E−06 | −1.1185E−06 |

Table 1 is detailed optical data of the imaging lens set 120, the IR-cut filter 140 and the image surface 150 of FIG. 1 according to the 1st embodiment, wherein the curvature radius, the thickness and the focal length are shown in millimeters (mm), and surface number 0-15 represented the surfaces sequentially arranged from the object side to the image side. Moreover, f represent a focal length of the imaging lens assembly, Fno represents an f-number of the imaging lens assembly, and HFOV represents half of a maximum field of view of the imaging lens assembly according to the 1st embodiment. Table 2 is the aspheric surface data of the 1st embodiment, wherein k represents the conic coefficient of the equation of the aspheric surface profiles, and A4-A16 represent the aspheric coefficients of each of the surfaces from the 4th order to the 16th order. The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_{i}(Ai) \times (Y^i);$$

wherein,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

2nd Embodiment

Figure 2A:
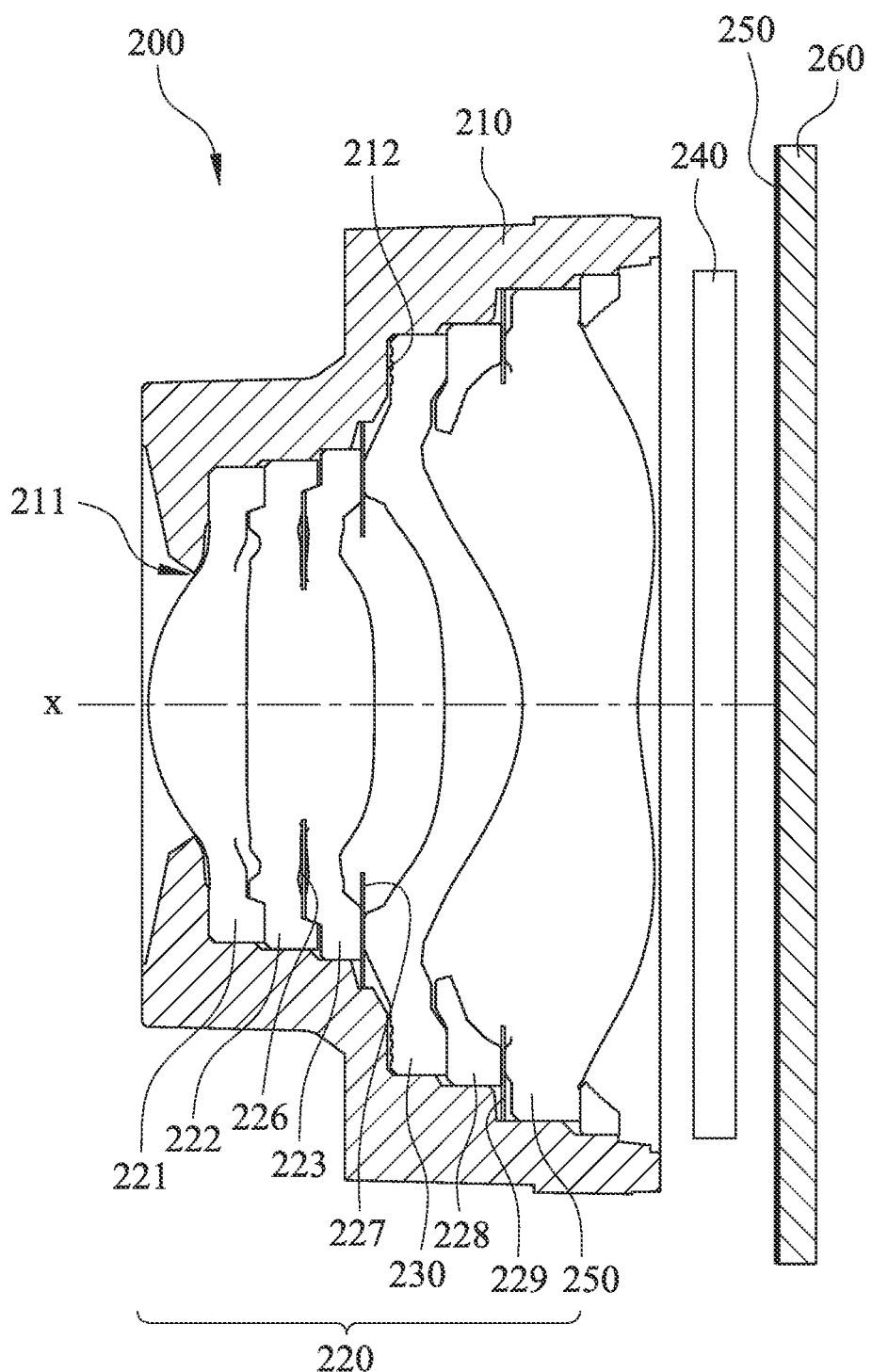
FIG. 2A is a schematic view of a camera module according to the 2nd embodiment of the present disclosure.
Figure 2B:
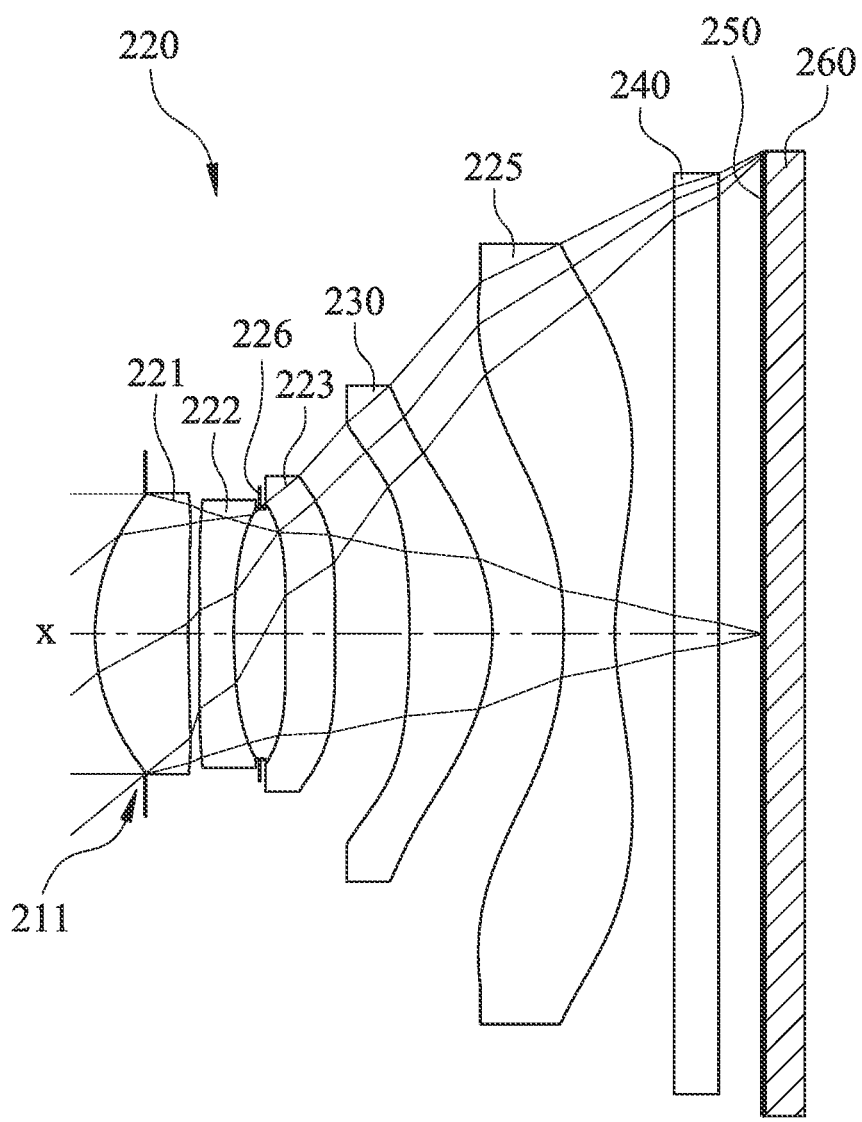
FIG. 2B is a schematic view of an imaging lens set of an imaging lens assembly of the camera module according to the 2nd embodiment.

FIG. 2A is a schematic view of a camera module according to the 2nd embodiment of the present disclosure. FIG. 2B is a schematic view of an imaging lens set 220 of an imaging lens assembly 200 of the camera module according to the 2nd embodiment. As shown in FIG. 2A, the camera module includes, in order from an object side to an image side along an optical axis X, an imaging lens assembly 200, an IR-cut filter 240 and an image surface 250, wherein the image surface 250 is disposed on an image side of the imaging lens assembly 200, and the image sensor 260 is disposed on the image surface 250. The imaging lens assembly 200 includes a plastic barrel 210 and an imaging lens set 220, wherein the imaging lens set 220 is disposed in the plastic barrel 210.

As shown in FIG. 2B, the imaging lens set 220 has the optical axis X and includes a plurality of optical elements, and the optical elements are, in order from the object side to the image side, a first plastic lens element 221, a second plastic lens element 222, a stop 226, a third plastic lens element 223, a light blocking sheet 227, a fourth plastic lens element 230, a spacer 228, a light blocking sheet 229 and a fifth plastic lens element 225.

The plastic barrel 210 includes an object-side aperture 211 and a first annular surface 212, wherein the object-side aperture 211 is an aperture stop of the imaging lens set 220, and the first annular surface 112 is formed in the plastic barrel 210 and surrounds the object-side aperture 211.

Figure 2C:
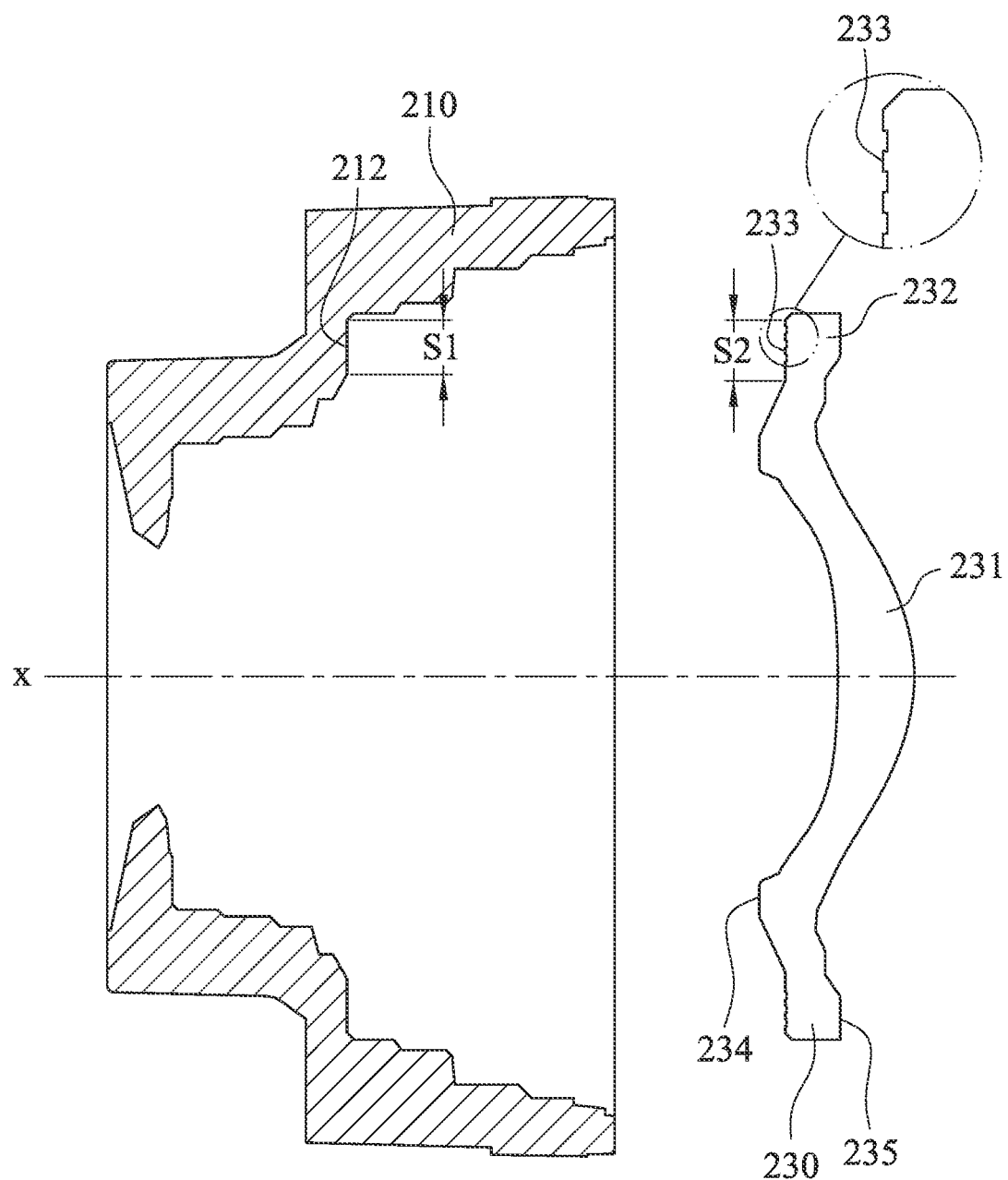
FIG. 2C is an exploded view of a plastic barrel and a fourth plastic lens element according to the 2nd embodiment.
Figure 2D:
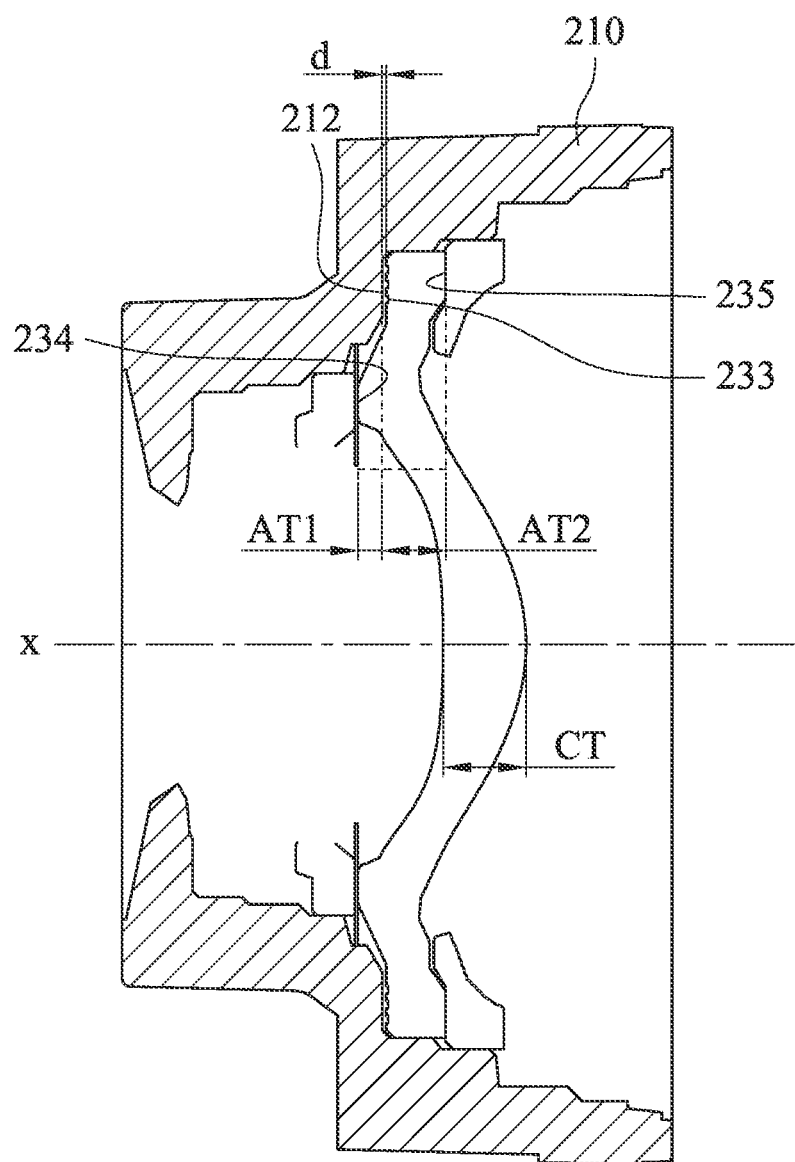
FIG. 2D is a schematic view of parameters of the 2nd embodiment.

FIG. 2C is an exploded view of the plastic barrel 210 and the fourth plastic lens element 230 according to the 2nd embodiment. FIG. 2D is a schematic view of parameters of the 2nd embodiment. The fourth plastic lens element 230 includes an effective optical portion 231, a peripheral portion 232, a second annular surface 233, an object-side connecting surface 234 and an image-side connecting surface 235. The peripheral portion 232 is formed around the effective optical portion 231. The second annular surface 233 is formed on an object-side surface of the fourth plastic lens element 230 and surrounds the effective optical portion 231, that is, the second annular surface 233 is disposed on the peripheral portion 232. The object-side connecting surface 234 is formed on an object-side surface of the fourth plastic lens element 230 and surrounds the effective optical portion 231, and the object-side connecting surface 234 is connected with one of the optical elements disposed on an object side of the fourth plastic lens element 230 (that is, the light blocking sheet 227 of the 2nd embodiment), wherein the object-side connecting surface 234 is closer to the effective optical portion 231 than the second annular surface 233 thereto. The image-side connecting surface 235 is formed on an image-side surface of the fourth plastic lens element 230 and surrounds the effective optical portion 231, and the image-side connecting surface 235 is connected with another of the optical elements disposed on an image side of the fourth plastic lens element 230 (that is, spacer 228 of the 2nd embodiment). The first annular surface 212 and the second annular surface 233 are parallel to each other, both of the first annular surface 212 and the second annular surface 233 are perpendicular to the optical axis X, and there is without additional one or more optical elements inserted between the first annular surface 212 and the second annular surface 233. The object-side connecting surface 234 and the image-side connecting surface 235 are parallel to each other, and both of the object-side connecting surface 234 and the image-side connecting surface 235 are perpendicular to the optical axis X.

At least one of the first annular surface 212 and the second annular surface 233 is an annular stepped surface arranged along a direction perpendicular to the optical axis X. In particular, as shown in FIG. 2C, the second annular surface 233 is an annular stepped surface arranged along the direction perpendicular to the optical axis X in the 2nd embodiment.

Please refer to FIG. 2C and FIG. 2D, the parameters shown below and the definitions thereof are the same as the 1st embodiment, and an explanation in this regard will not be provided again.

| 2nd embodiment | | | |
|---|---|---|---|
| AT1 (mm) | −0.162 | CT (mm) | 0.558 |
| AT2 (mm) | 0.428 | S1 (mm) | 0.396 |
| AT1/AT2 | −0.379 | S2 (mm) | 0.443 |
| d (mm) | 0.028 | (S1/S2) × 100% | 89.4% |

Figure 2E:
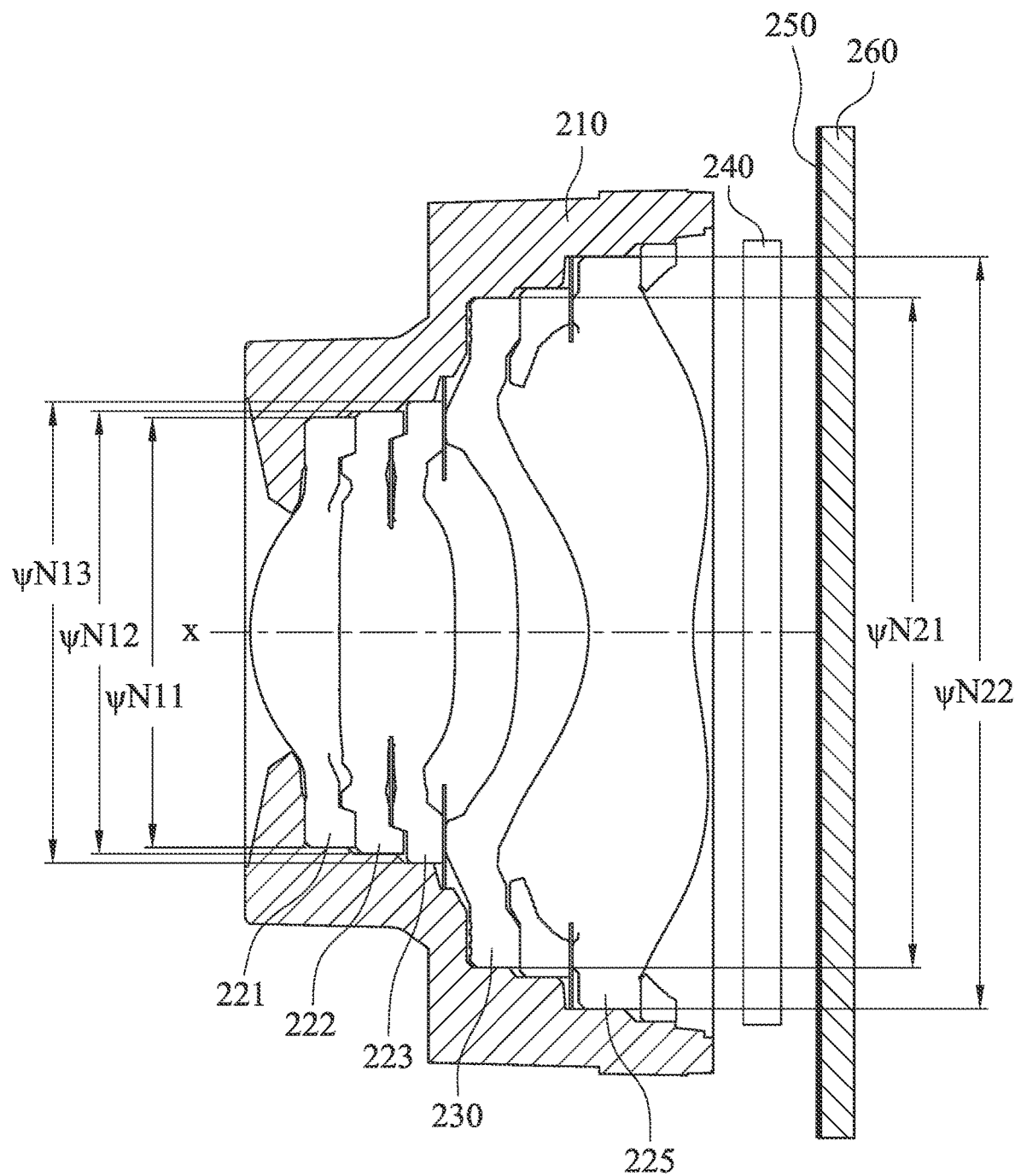
FIG. 2E is a schematic view of outer diameters of each of the plastic lens elements of the imaging lens set according to the 2nd embodiment.

When a number of the plastic lens elements is N, a number of the plastic lens elements having an outer diameter $\psi N1i$ is N1, and a number of the plastic lens element having an outer diameter $\psi N2j$ is N2, the following conditions are satisfied: $5 \leq N < 10$; $N = N1 + N2$; 2.8 mm $< \psi N1i <$ 3.8 mm, wherein i=1, 2, 3 . . . N−1; and 4.7 mm $< \psi N2j <$ 7.0 mm, wherein j=1, 2 . . . N−N1. Please refer to FIG. 2E, which is a schematic view of outer diameters of each of the plastic lens elements of the imaging lens set 220 according to the 2nd embodiment. As shown in FIG. 2E, in the 2nd embodiment, N=5, N1=3 (those are, the first plastic lens element 221, the second plastic lens element 222 and the third plastic lens element 223), N2=2 (those are, the fourth plastic lens element 230 and the fifth plastic lens element 225), and values of the outer diameters of each of the plastic lens elements are shown below.

| 2nd embodiment | | | | | |
|---|---|---|---|---|---|
| Plastic Lens Element | 221 $\psi N11$ | 122 $\psi N12$ | 223 $\psi N13$ | 230 $\psi N21$ | 225 $\psi N22$ |
| Outer Diameter (mm) | 3.4 | 3.5 | 3.65 | 5.3 | 5.95 |

The detailed optical data of the 2nd embodiment are shown in Table 3 and the aspheric surface data are shown in Table 4 below.

TABLE 3

2nd embodiment
f = 3.87 mm, Fno = 2.05, HFOV = 39.5 deg.

| Surface # | | Curvature radius | | Thickness | Material | Index | Abbe # | Focal Length |
|---|---|---|---|---|---|---|---|---|
| 0 | Object | Plano | | Infinity | | | | |
| 1 | Ape. stop | Plano | | −0.339 | | | | |
| 2 | Lens 1 | 1.434 | ASP | 0.627 | Plastic | 1.545 | 56.0 | 3.18 |
| 3 | | 7.017 | ASP | 0.075 | | | | |
| 4 | Lens 2 | 11.905 | ASP | 0.230 | Plastic | 1.660 | 20.4 | −6.79 |

TABLE 3-continued

2nd embodiment
f = 3.87 mm, Fno = 2.05, HFOV = 39.5 deg.

| Surface # | | Curvature radius | | Thickness | Material | Index | Abbe # | Focal Length |
|---|---|---|---|---|---|---|---|---|
| 5 | | 3.230 | ASP | 0.176 | | | | |
| 6 | Stop | Plano | | 0.173 | | | | |
| 7 | Lens 3 | 25.368 | ASP | 0.334 | Plastic | 1.566 | 37.4 | 39.79 |
| 8 | | −200.000 | ASP | 0.501 | | | | |
| 9 | Lens 4 | −7.132 | ASP | 0.558 | Plastic | 1.544 | 56.0 | 2.93 |
| 10 | | −1.340 | ASP | 0.479 | | | | |
| 11 | Lens 5 | −3.147 | ASP | 0.344 | Plastic | 1.534 | 55.9 | −2.20 |
| 12 | | 1.949 | ASP | 0.400 | | | | |
| 13 | IR-cut filter | Plano | | 0.300 | Glass | 1.517 | 64.2 | — |
| 14 | | Plano | | 0.301 | | | | |
| 15 | Image surface | Plano | | | | | | |

Reference wavelength is 587.6 nm (d-line).
Effective radius of Surface 6 is 0.845 mm.

TABLE 4

Aspheric Coefficients

| Surface # | 2 | 3 | 4 | 5 | 7 |
|---|---|---|---|---|---|
| k = | −8.7708E−02 | −4.2074E+01 | 7.9293E+00 | −7.0051E+00 | −4.8844E+01 |
| A4 = | 4.2185E−03 | −1.6384E−01 | −2.6008E−01 | −9.3578E−02 | −2.2593E−01 |
| A6 = | −1.0722E−02 | 2.8299E−01 | 6.6482E−01 | 4.6345E−01 | −7.7557E−02 |
| A8 = | 1.0134E−01 | −2.0133E−01 | −6.7146E−01 | −4.0513E−01 | 3.1320E−01 |
| A10 = | −2.8109E−01 | −4.0737E−03 | 3.0151E−01 | 1.1650E−01 | −6.2329E−01 |
| A12 = | 3.3367E−01 | 7.7646E−03 | −4.2762E−02 | 1.0293E−01 | 3.7296E−01 |
| A14 = | −1.5900E−01 | | | | |

| Surface # | 8 | 9 | 10 | 11 | 12 |
|---|---|---|---|---|---|
| k = | −9.9000E+01 | 5.0073E+00 | −7.5305E+00 | −1.0912E+00 | −1.4157E+01 |
| A4 = | −1.9162E−01 | −4.5721E−02 | −2.3159E−01 | −1.2042E−01 | −8.0120E−02 |
| A6 = | 4.9255E−02 | −3.8277E−02 | 3.1239E−01 | 8.9331E−02 | 3.6782E−02 |
| A8 = | −2.6034E−01 | 2.9436E−02 | −3.2820E−01 | −2.9881E−02 | −1.2075E−02 |
| A10 = | 4.9982E−01 | −4.8924E−02 | 2.2435E−01 | 6.3476E−03 | 2.3735E−03 |
| A12 = | −5.0712E−01 | 3.4284E−02 | −8.6701E−02 | −8.6531E−04 | −2.7878E−04 |
| A14 = | 2.1081E−01 | −6.8793E−03 | 1.7380E−02 | 6.8309E−05 | 1.8892E−05 |
| A16 = | | | −1.4194E−03 | −2.3534E−06 | −5.7559E−07 |

In the 2nd embodiment, the equation of the aspheric surface profiles is the same as the equation of the 1st embodiment, so an explanation in this regard will not be provided again.

3rd Embodiment

Figure 3A:
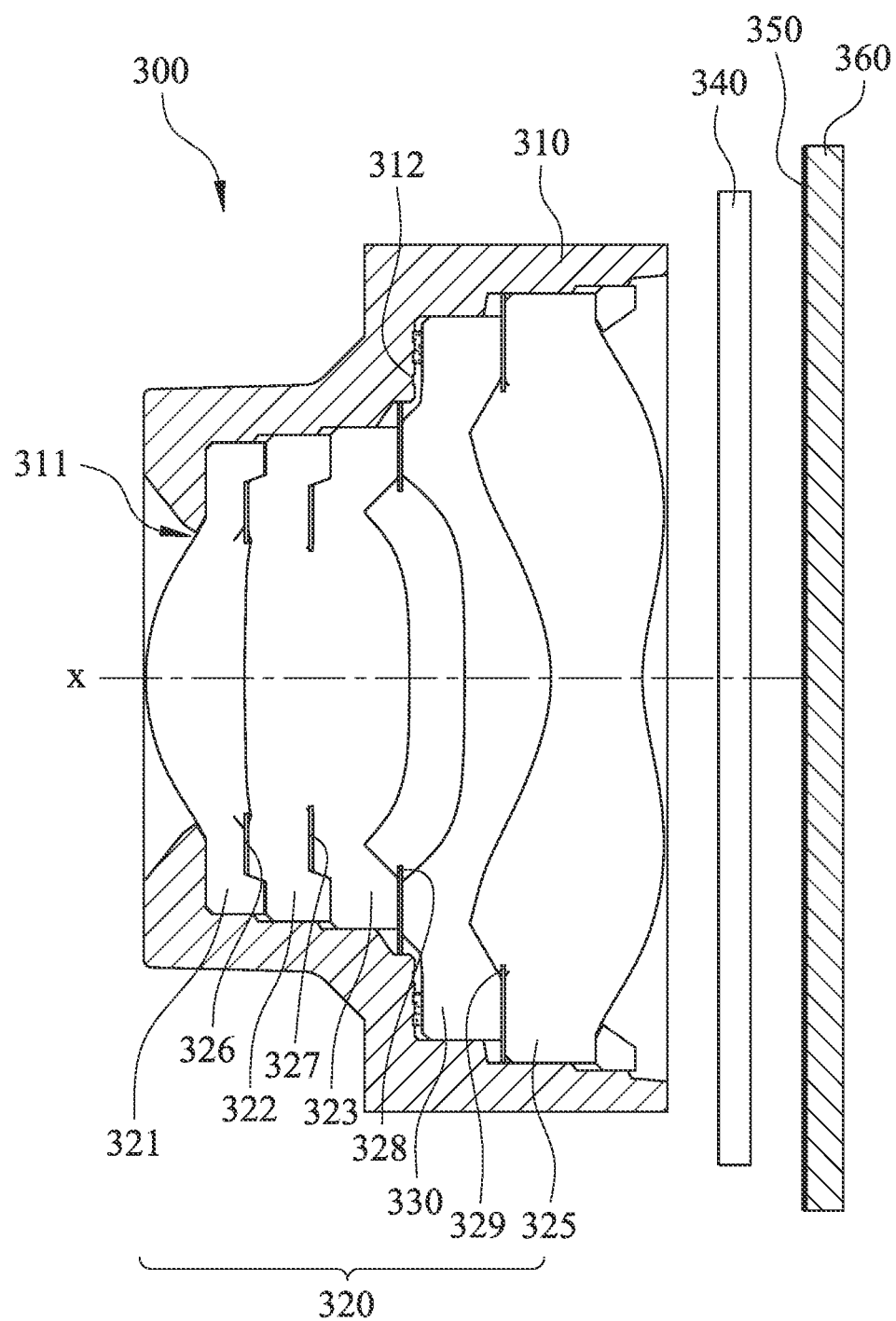
FIG. 3A is a schematic view of a camera module according to the 3rd embodiment of the present disclosure.
Figure 3B:
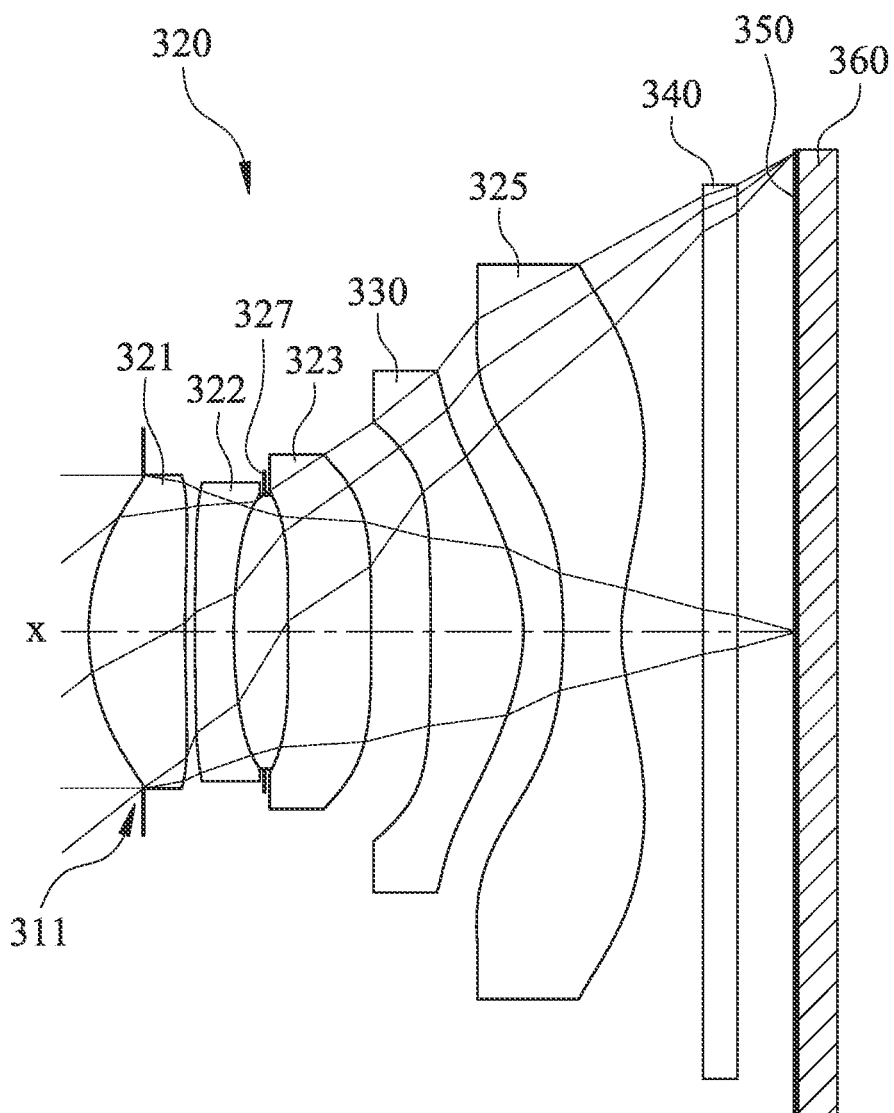
FIG. 3B is a schematic view of an imaging lens set of an imaging lens assembly of the camera module according to the 3rd embodiment.

FIG. 3A is a schematic view of a camera module according to the 3rd embodiment of the present disclosure. FIG. 3B is a schematic view of an imaging lens set 320 of an imaging lens assembly 300 of the camera module according to the 3rd embodiment. As shown in FIG. 3A, the camera module includes, in order from an object side to an image side along an optical axis X, an imaging lens assembly 300, an IR-cut filter 340 and an image surface 350, wherein the image surface 350 is disposed on an image side of the imaging lens assembly 300, and the image sensor 360 is disposed on the image surface 350. The imaging lens assembly 300 includes a plastic barrel 310 and an imaging lens set 320, wherein the imaging lens set 320 is disposed in the plastic barrel 310.

As shown in FIG. 3B, the imaging lens set 320 has the optical axis X and includes a plurality of optical elements, and the optical elements are, in order from the object side to the image side, a first plastic lens element 321, a light blocking sheet 326, a second plastic lens element 322, a stop 327, a third plastic lens element 323, a light blocking sheet 328, a fourth plastic lens element 330, a spacer 329 and a fifth plastic lens element 325.

The plastic barrel 310 includes an object-side aperture 311 and a first annular surface 312, wherein the object-side aperture 311 is an aperture stop of the imaging lens set 320, and the first annular surface 312 is formed in the plastic barrel 310 and surrounds the object-side aperture 311.

Figure 3C:
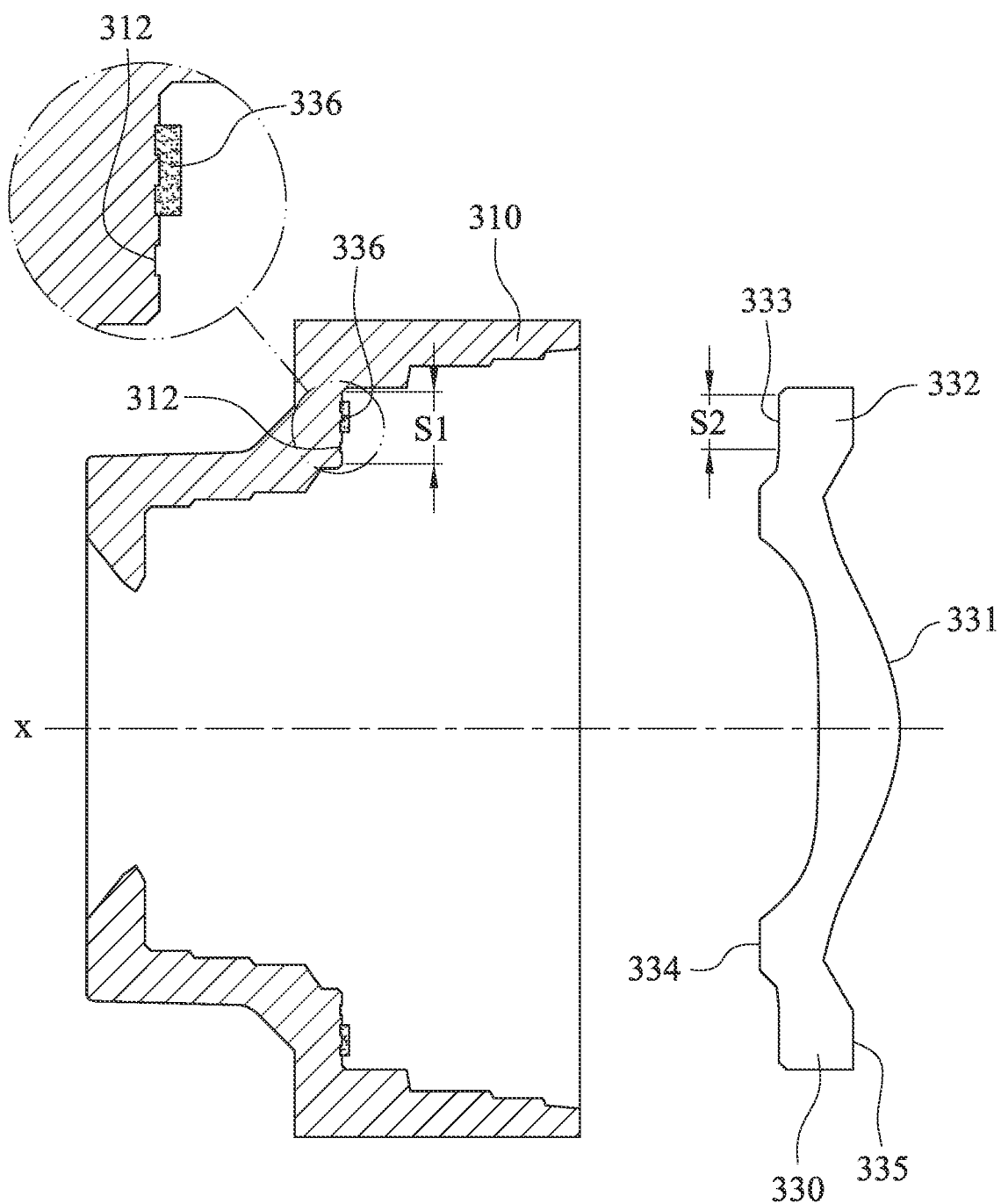
FIG. 3C is an exploded view of a plastic barrel and a fourth plastic lens element according to the 3rd embodiment.
Figure 3D:
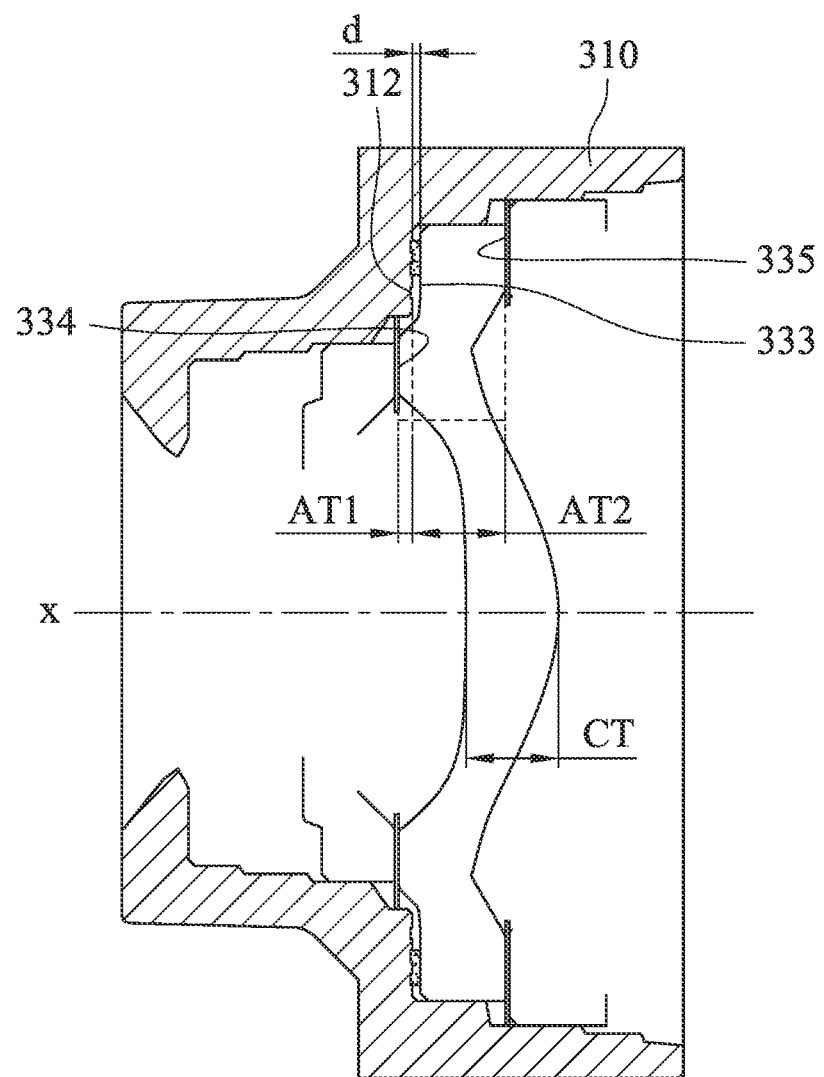
FIG. 3D is a schematic view of parameters of the 3rd embodiment.

FIG. 3C is an exploded view of the plastic barrel 310 and the fourth plastic lens element 330 according to the 3rd embodiment. FIG. 3D is a schematic view of parameters of the 3rd embodiment. The fourth plastic lens element 330 includes an effective optical portion 331, a peripheral portion 332, a second annular surface 333, an object-side connecting surface 334 and an image-side connecting surface 335. The peripheral portion 332 is formed around the effective optical portion 331. The second annular surface 333 is formed on an object-side surface of the fourth plastic lens element 330 and surrounds the effective optical portion 331, that is, the second annular surface 333 is disposed on the peripheral portion 332. The object-side connecting surface 334 is formed on an object-side surface of the fourth plastic lens element 330 and surrounds the effective optical portion 331, and the object-side connecting surface 334 is connected with one of the optical elements disposed on an object side of the fourth plastic lens element 330 (that is, the light blocking sheet 328 of the 3rd embodiment), wherein the object-side connecting surface 334 is closer to the effective optical portion 331 than the second annular surface 333 thereto. The image-side connecting surface 335 is formed on an image-side surface of the fourth plastic lens element 330 and surrounds the effective optical portion 331, and the image-side connecting surface 335 is connected with another of the optical elements disposed on an image side of the fourth plastic lens element 330 (that is, the light blocking sheet 329 of the 3rd embodiment). The first annular surface 312 and the second annular surface 333 are parallel to each other, both of the first annular surface 312 and the second annular surface 333 are perpendicular to the optical axis X, and there is without additional one or more optical elements inserted between the first annular surface 312 and the second annular surface 333. The object-side connecting surface 334 and the image-side connecting surface 335 are parallel to each other, and both of the object-side connecting surface 334 and the image-side connecting surface 335 are perpendicular to the optical axis X.

At least one of the first annular surface 312 and the second annular surface 333 is an annular stepped surface arranged along a direction perpendicular to the optical axis X. In particular, as shown in FIG. 3C, the first annular surface 312 is an annular stepped surface arranged along the direction perpendicular to the optical axis X in the 3rd embodiment.

Furthermore, please refer to the FIG. 3C and FIG. 3D, a mucilage material 336 is applied between the first annular surface 312 and the second annular surface 333. In detail, the mucilage material 336 can be applied on one of the first annular surface 312 and the second annular surface 333 in advance. When the first annular surface 312 and the second annular surface 333 becomes closer to each other during the assembling process, the compression force between two of the surfaces can be absorbed so as to protect an optical effective portion of the plastic lens element from affecting by external forces. After the mucilage material 336 is cured, the mucilage material 336 can be used to fix spaces between the adjacent plastic lens elements and served as a compression absorption material.

Please refer to FIG. 3C and FIG. 3D, the parameters shown below and the definitions thereof are the same as the 1st embodiment, and an explanation in this regard will not be provided again.

| 3rd embodiment | | | |
|---|---|---|---|
| AT1 (mm) | −0.084 | CT (mm) | 0.567 |
| AT2 (mm) | 0.57 | S1 (mm) | 0.503 |
| AT1/AT2 | −0.147 | S2 (mm) | 0.38 |
| d (mm) | 0.05 | (S1/S2) × 100% | 132.3% |

Figure 3E:
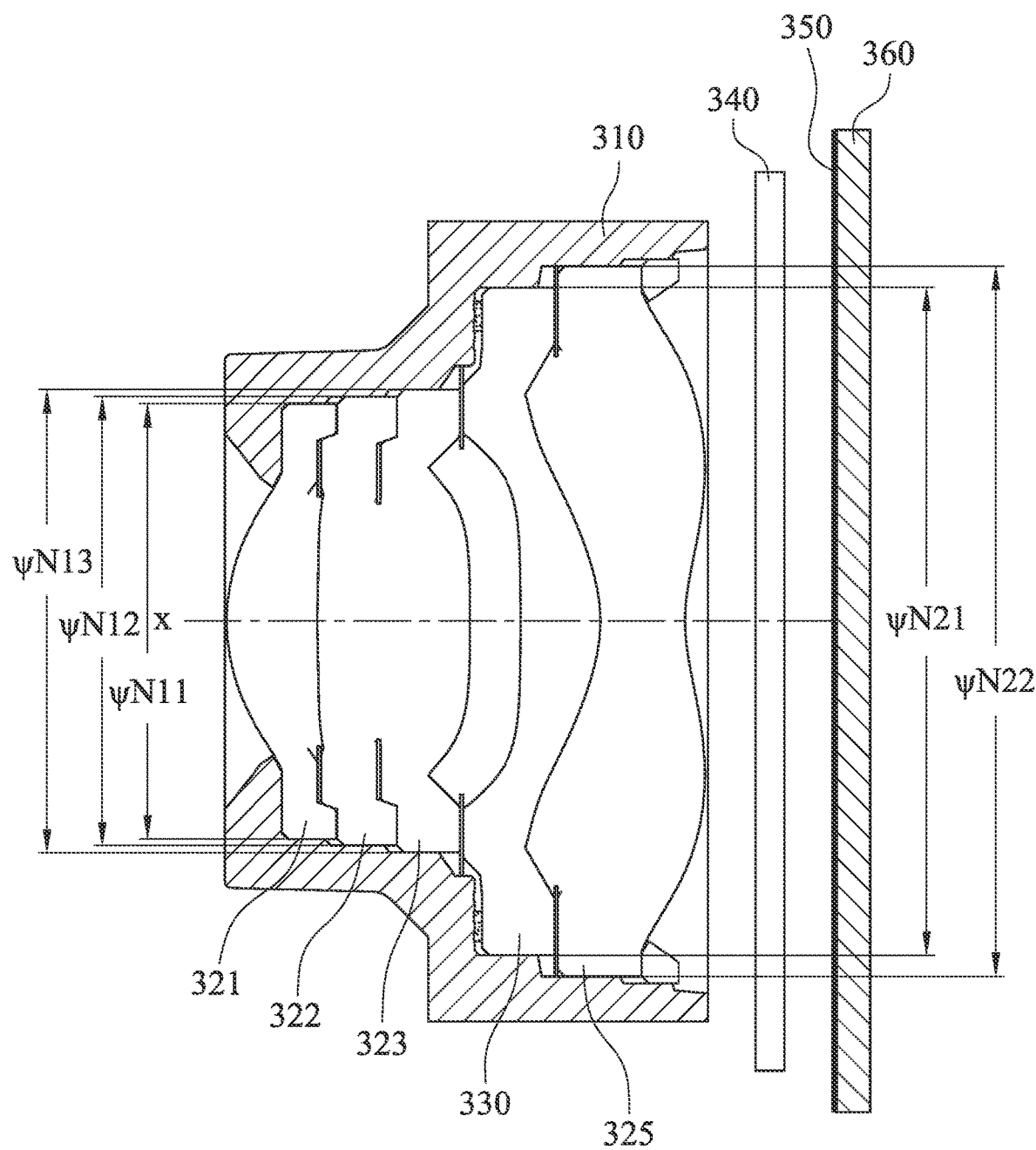
FIG. 3E is a schematic view of outer diameters of each plastic lens element of the imaging lens set according to the 3rd embodiment.

When a number of the plastic lens elements is N, a number of the plastic lens elements having an outer diameter ψN1i is N1, and a number of plastic lens elements having an outer diameter ψN2j is N2, the following conditions are satisfied: 5≤N<10; N=N1+N2; 2.8 mm<ψN1i<3.8 mm, wherein i=1, 2, 3 . . . N−1; and 4.7 mm<ψN2j<7.0 mm, wherein j=1, 2 . . . N−N1. Please refer to FIG. 3E, which is a schematic view of outer diameters of each of the plastic lens elements of the imaging lens set 320 according to the 3rd embodiment. As shown in FIG. 3E, in the 3rd embodiment, N=5, N1=3 (those are, the first plastic lens element 321, the second plastic lens element 322 and the third plastic lens element 323), N2=2 (those are, the fourth plastic lens element 330 and the fifth plastic lens element 325), and values of the outer diameters of each of the plastic lens elements are shown below.

| 3rd embodiment | | | | | |
|---|---|---|---|---|---|
| Plastic Lens Element | 321 | 322 | 323 | 330 | 325 |
| | ψN11 | ψN12 | ψN13 | ψN21 | ψN22 |
| Outer Diameter (mm) | 3.1 | 3.2 | 3.3 | 4.76 | 5.06 |

The detailed optical data of the 3rd embodiment are shown in Table 5 and the aspheric surface data are shown in Table 6 below.

TABLE 5

3rd embodiment
f = 3.62 mm, Fno= 1.89, HFOV= 38.5 deg.

| Surface # | | Curvature radius | | Thickness | Material | Index | Abbe # | Focal Length |
|---|---|---|---|---|---|---|---|---|
| 0 | Object | Plano | | Infinity | | | | |
| 1 | Ape. stop | Plano | | −0.334 | | | | |
| 2 | Lens 1 | 1.414 | ASP | 0.589 | Plastic | 1.545 | 56.0 | 3.31 |
| 3 | | 5.584 | ASP | 0.060 | | | | |
| 4 | Lens 2 | 6.584 | ASP | 0.239 | Plastic | 1.669 | 19.5 | −8.91 |
| 5 | | 3.082 | ASP | 0.188 | | | | |
| 6 | Stop | Plano | | 0.145 | | | | |
| 7 | Lens 3 | 61.926 | ASP | 0.510 | Plastic | 1.544 | 56.0 | 44.63 |
| 8 | | −39.832 | ASP | 0.364 | | | | |
| 9 | Lens 4 | −17.354 | ASP | 0.567 | Plastic | 1.544 | 56.0 | 2.18 |
| 10 | | −1.122 | ASP | 0.244 | | | | |
| 11 | Lens 5 | −3.377 | ASP | 0.356 | Plastic | 1.534 | 55.9 | −1.73 |
| 12 | | 1.320 | ASP | 0.500 | | | | |
| 13 | IR-cut filter | Plano | | 0.210 | Glass | 1.517 | 64.2 | — |
| 14 | | Plano | | 0.361 | | | | |
| 15 | Image Surface | Plano | | | | | | |

Reference wavelength is 587.6 nm (d-line).
Effective radius of Surface 6 is 0.840 mm.

TABLE 6

Aspheric Coefficients

| Surface # | 2 | 3 | 4 | 5 | 7 |
|---|---|---|---|---|---|
| k = | −1.0434E+00 | −6.9124E+00 | 7.4219E+00 | 7.0785E+00 | −9.0000E+01 |
| A4 = | 3.2168E−02 | −2.6820E−01 | −3.4563E−01 | −1.5500E−01 | −1.5221E−01 |
| A6 = | 5.2179E−02 | 4.1018E−01 | 7.8306E−01 | 3.9240E−01 | −5.0688E−01 |
| A8 = | −7.2934E−02 | −1.0431E−01 | −5.0180E−01 | 5.3438E−02 | 2.8895E+00 |
| A10 = | −2.3907E−02 | −5.4115E−01 | −4.1632E−01 | −9.9651E−01 | −9.1924E+00 |
| A12 = | 1.4817E−01 | 5.6947E−01 | 7.8159E−01 | 1.2820E+00 | 1.6351E+01 |
| A14 = | −1.2662E−01 | −1.9199E−01 | −3.1169E−01 | −4.2827E−01 | −1.5687E+01 |
| A16 = | | | | | 6.3082E+00 |

| Surface # | 8 | 9 | 10 | 11 | 12 |
|---|---|---|---|---|---|
| k = | −7.9774E+01 | 3.0077E+01 | −9.7347E−01 | 2.6127E−01 | −8.3924E+00 |
| A4 = | −1.2898E−01 | 1.0375E−03 | 3.1597E−01 | −8.9684E−02 | −1.4758E−01 |
| A6 = | −2.3196E−01 | 8.7018E−03 | −3.7353E−01 | −1.2952E−01 | 8.3479E−02 |
| A8 = | 6.6284E−01 | −3.4047E−01 | 2.8623E−01 | 2.0238E−01 | −3.4417E−02 |
| A10 = | −1.4024E+00 | 5.9214E−01 | −1.1987E−01 | −1.0233E−01 | 9.4688E−03 |
| A12 = | 1.7221E+00 | −5.3338E−01 | 2.8612E−02 | 2.6044E−02 | −1.6961E−03 |
| A14 = | −1.1492E+00 | 2.3979E−01 | −3.8053E−03 | −3.4084E−03 | 1.7810E−04 |
| A16 = | 3.2541E−01 | −4.1504E−02 | 2.1493E−04 | 1.8348E−04 | −8.0743E−06 |

In the 3rd embodiment, the equation of the aspheric surface profiles is the same as the equation of the 1st embodiment, so an explanation in this regard will not be provided again.

4th Embodiment

Figure 4A:
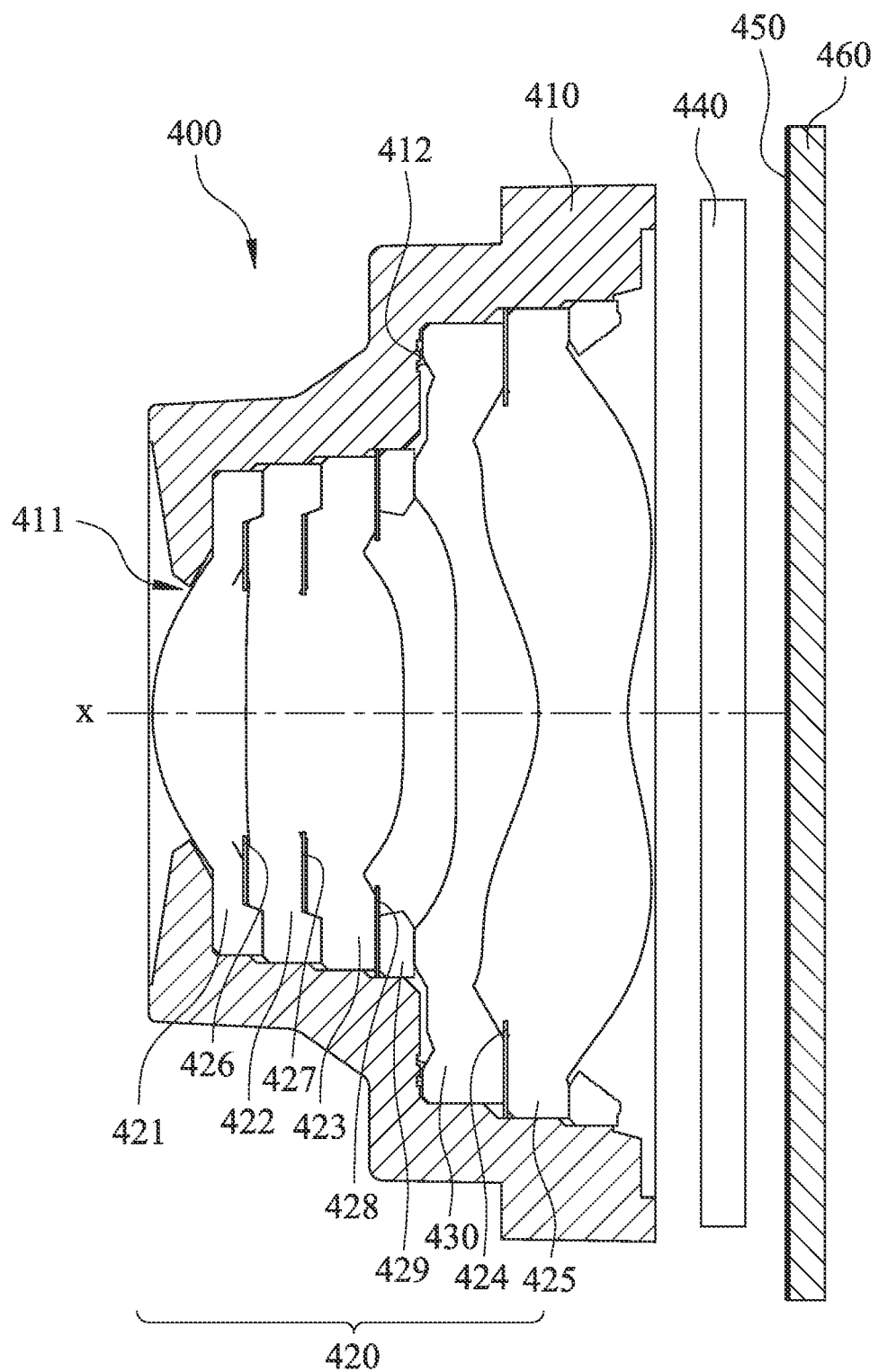
FIG. 4A is a schematic view of a camera module according to the 4th embodiment of the present disclosure.
Figure 4B:
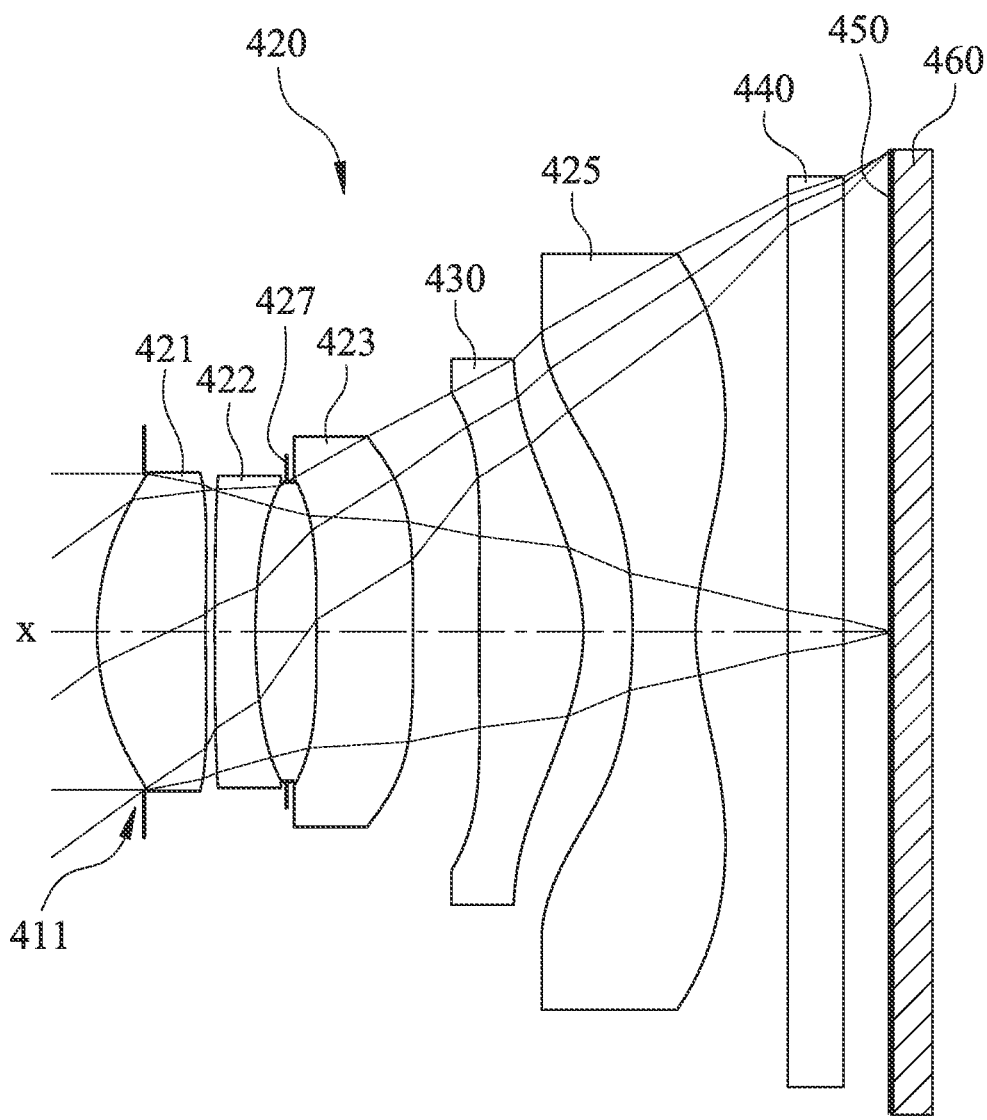
FIG. 4B is a schematic view of an imaging lens set of an imaging lens assembly of the camera module according to the 4th embodiment.

FIG. 4A is a schematic view of a camera module according to the 4th embodiment of the present disclosure. FIG. 4B is a schematic view of an imaging lens set 420 of an imaging lens assembly 400 of the camera module according to the 4th embodiment. As shown in FIG. 4A, the camera module includes, in order from an object side to an image side along an optical axis X, an imaging lens assembly 400, an IR-cut filter 440 and an image surface 450, wherein the image surface 450 is disposed on an image side of the imaging lens assembly 400, and the image sensor 460 is disposed on the image surface 450. The imaging lens assembly 400 includes a plastic barrel 410 and an imaging lens set 420, wherein the imaging lens set 420 is disposed in the plastic barrel 410.

As shown in FIG. 4B, the imaging lens set 420 has the optical axis X and includes a plurality of optical elements, and the optical elements are, in order from the object side to the image side, a first plastic lens element 421, a light blocking sheet 426, a second plastic lens element 422, a stop 427, a third plastic lens element 423, a light blocking sheet 428, a spacer 429, a fourth plastic lens element 430, a light blocking sheet 424 and a fifth plastic lens element 425.

The plastic barrel 410 includes an object-side aperture 411 and a first annular surface 412, wherein the object-side aperture 411 is an aperture stop of the imaging lens set 420, and the first annular surface 412 is formed in the plastic barrel 410 and surrounds the object-side aperture 411.

Figure 4C:
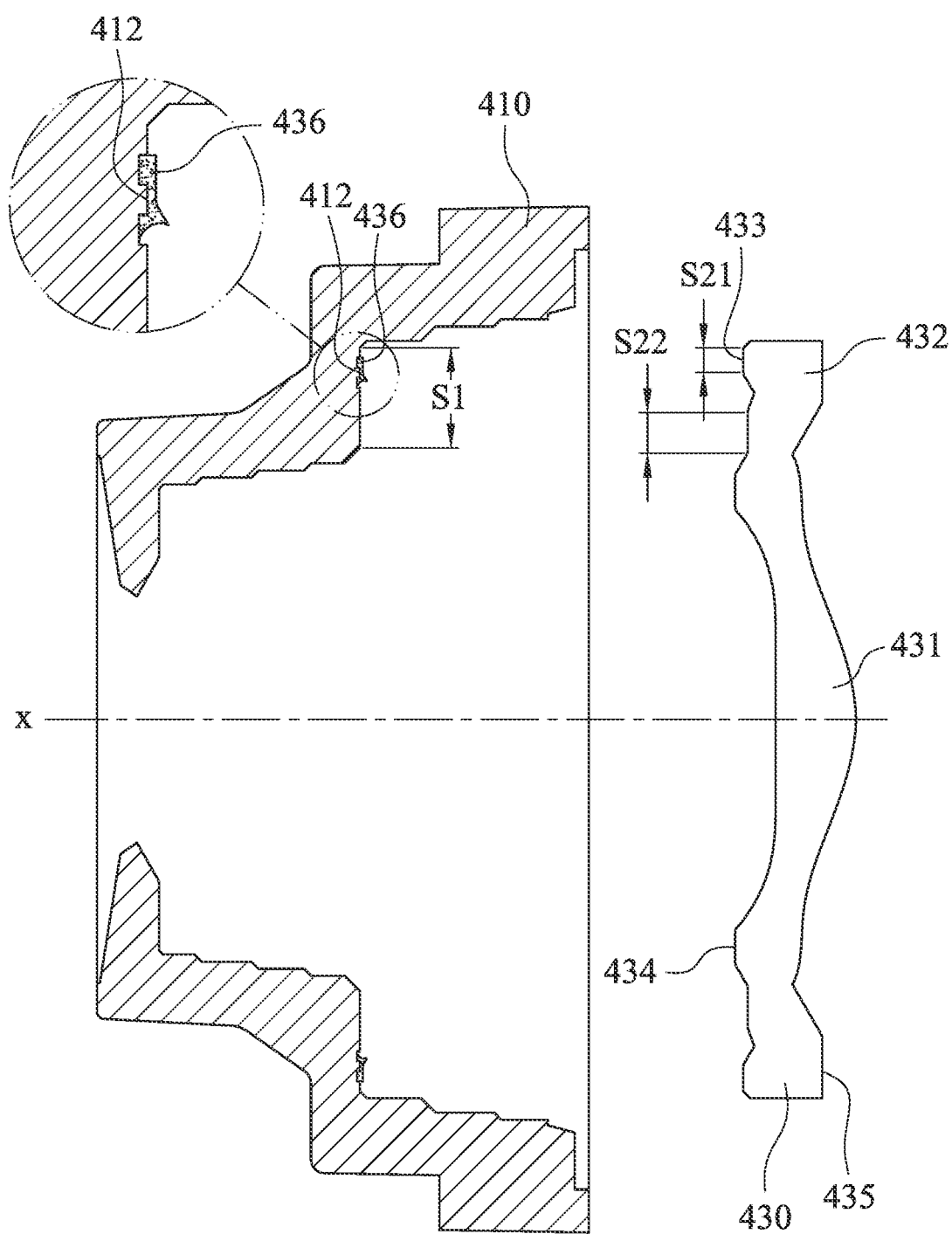
FIG. 4C is an exploded view of a plastic barrel and a fourth plastic lens element according to the 4th embodiment.
Figure 4D:
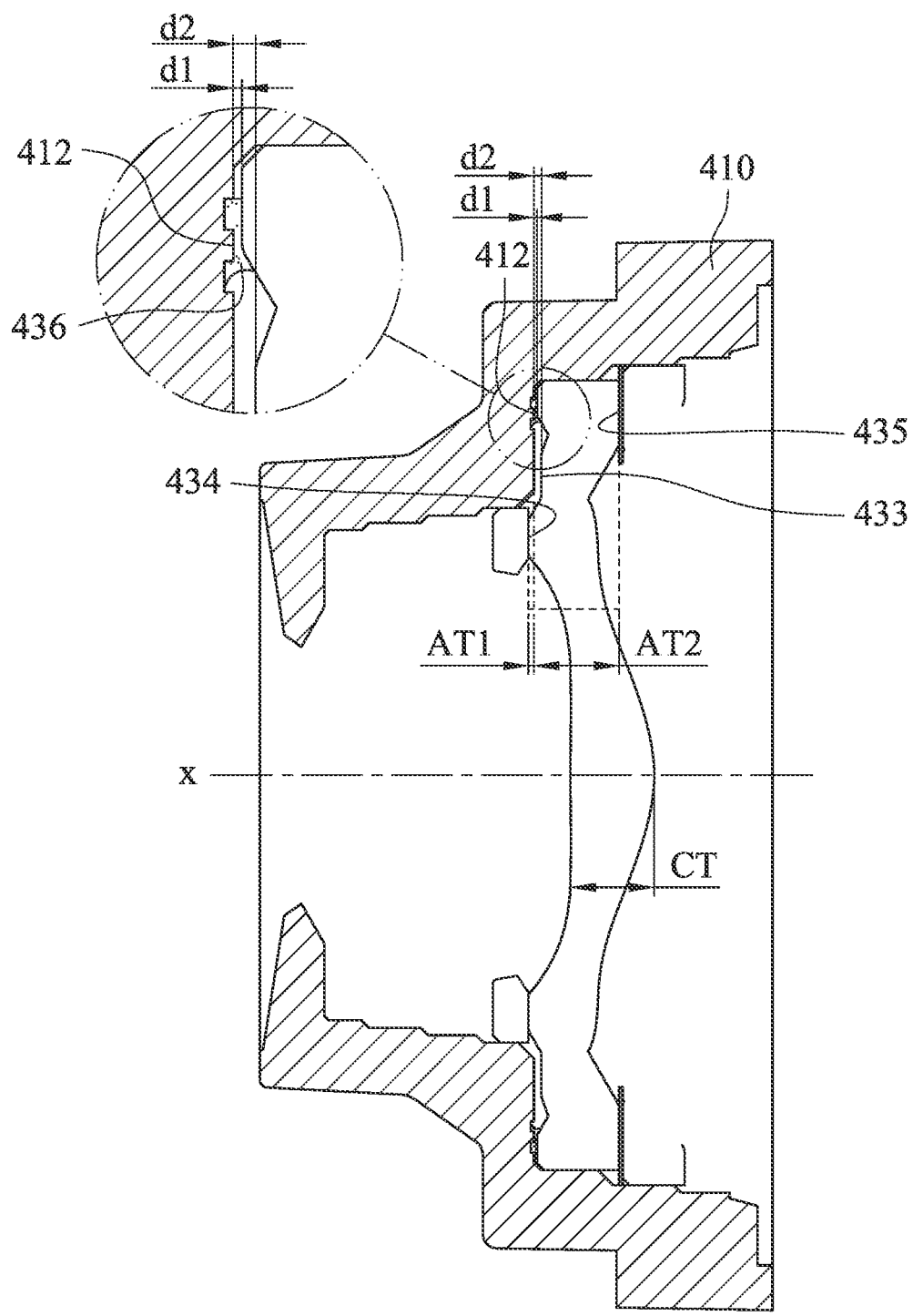
FIG. 4D is a schematic view of parameters of the 4th embodiment.

FIG. 4C is an exploded view of the plastic barrel 410 and the fourth plastic lens element 430 according to the 4th embodiment. FIG. 4D is a schematic view of parameters of the 4th embodiment. The fourth plastic lens element 430 includes an effective optical portion 431, a peripheral portion 432, a second annular surface 433, an object-side connecting surface 434 and an image-side connecting surface 435. The peripheral portion 432 is formed around the effective optical portion 431. The second annular surface 433 is formed on an object-side surface of the fourth plastic lens element 430 and surrounds the effective optical portion 431, that is, the second annular surface 433 is disposed on the peripheral portion 432. The object-side connecting surface 434 is formed on an object-side surface of the fourth plastic lens element 430 and surrounds the effective optical portion 431, and the object-side connecting surface 434 is connected with one of the optical elements disposed on an object side of the fourth plastic lens element 430 (that is, the spacer 429 of the 4th embodiment), wherein the object-side connecting surface 434 is closer to the effective optical portion 431 than the second annular surface 433 thereto. The image-side connecting surface 435 is formed on an image-side surface of the fourth plastic lens element 430 and surrounds the effective optical portion 431, and the image-side connecting surface 435 is connected with another of the optical elements disposed on an image side of the fourth plastic lens element 430 (that is, the light blocking sheet 424 of the 4th embodiment). The first annular surface 412 and the second annular surface 433 are parallel to each other, both of the first annular surface 412 and the second annular surface 433 are perpendicular to the optical axis X, and there is without additional one or more optical elements inserted between the first annular surface 412 and the second annular surface 433. The object-side connecting surface 434 and the image-side connecting surface 435 are parallel to each other, and both of the object-side connecting surface 434 and the image-side connecting surface 435 are perpendicular to the optical axis X.

At least one of the first annular surface 412 and the second annular surface 433 is an annular stepped surface arranged along a direction perpendicular to the optical axis X. In particular, as shown in FIG. 4C, the first annular surface 412 is an annular stepped surface arranged along the direction perpendicular to the optical axis X in the 4th embodiment.

Furthermore, please refer to the FIG. 4C and FIG. 4D, a mucilage material 436 is applied between the first annular surface 412 and the second annular surface 433. In detail, the mucilage material 436 can be applied on one of the first annular surface 412 and the second annular surface 433 in advance. When the first annular surface 412 and the second annular surface 433 is closing to each other during the assembling process, the compression force between two of the surfaces can be absorbed so as to protect an optical effective portion of the plastic lens element from affecting by external forces. After the mucilage material 436 is cured, the mucilage material 436 can be used to fix spaces between the adjacent plastic lens elements and served as a compression absorption material.

Please refer to FIG. 4C and FIG. 4D, the parameters shown below and the definitions thereof are the same as the 1st embodiment, and an explanation in this regard will not be provided again. Furthermore, in the 4th embodiment, a length of the second annular surface 433 perpendicular to the optical axis X is S2, and the length S2 includes S21 and S22 from the effective optical portion 431 toward the peripheral portion 432, wherein S2=S21+S22. Two air spaces are disposed between the first annular surface 412 and the second annular surface 433 corresponding, and two lengths of the two air spaces disposed between the first annular surface 412 and the second annular surface 433 being from the peripheral portion 432 toward the effective optical portion 431 are d1 and d2, respectively.

| 4th embodiment | | | |
|---|---|---|---|
| AT1 (mm) | −0.037 | CT (mm) | 0.563 |
| AT2 (mm) | 0.573 | S1 (mm) | 0.701 |
| AT1/AT2 | −0.065 | S21 (mm) | 0.171 |
|  |  | S22 (mm) | 0.285 |
| d1 (mm) | 0.02 | (S1/S2) × 100% | 153.7% |
| d2 (mm) | 0.05 |  |  |

Figure 4E:
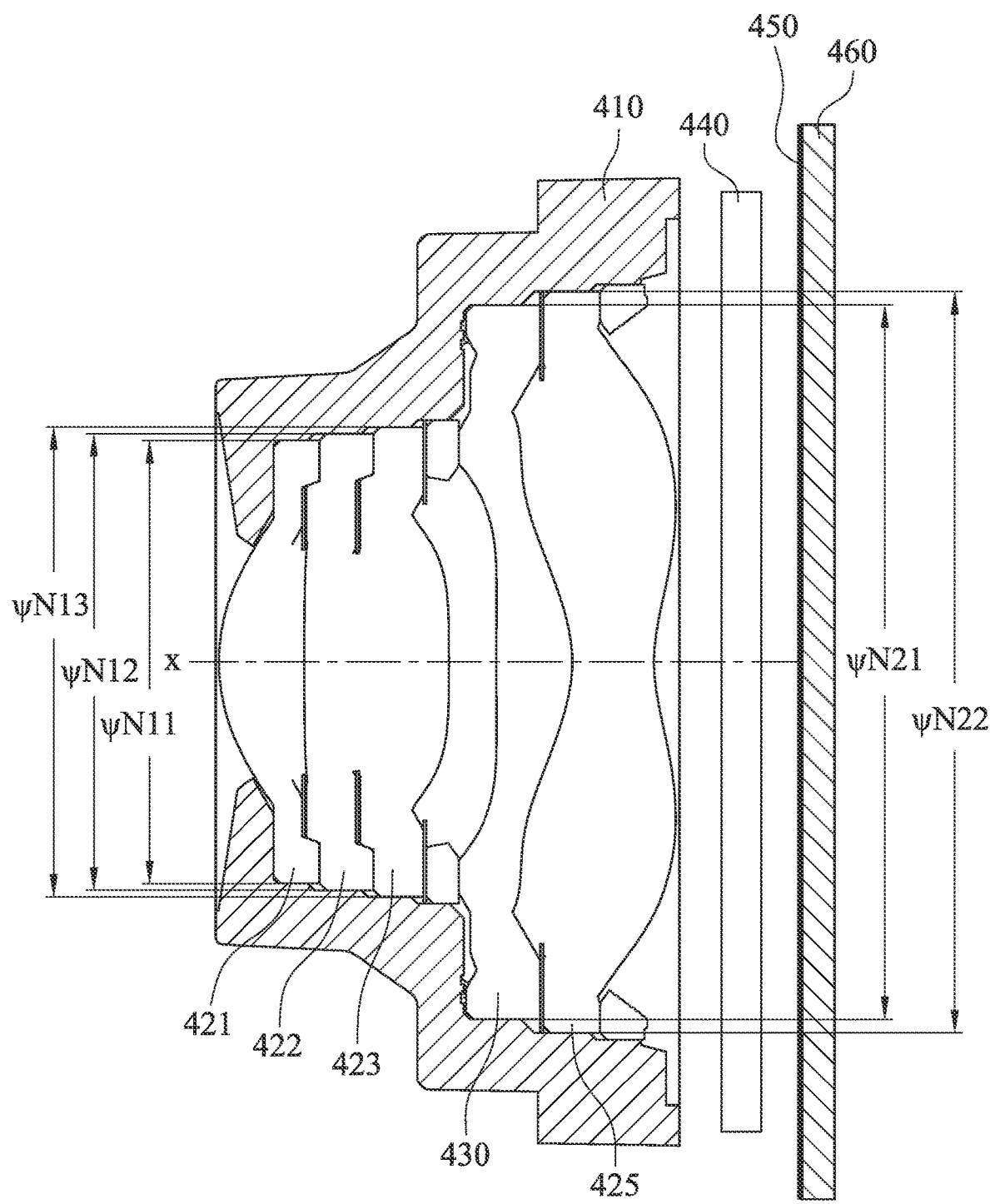
FIG. 4E is a schematic view of outer diameters of each plastic lens element of the imaging lens set according to the 4th embodiment.

When a number of the plastic lens elements is N, a number of the plastic lens elements having an outer diameter $\psi N1i$ is N1, and a number of plastic lens elements having an outer diameter $\psi N2j$ is N2, the following conditions are satisfied: $5 \leq N<10$; $N=N1+N2$; 2.8 mm$<\psi N1i<$3.8 mm, wherein i=1, 2, 3 . . . N−1; and 4.7 mm$<\psi N2j<$7.0 mm, wherein j=1, 2 . . . N−N1. Please refer to FIG. 3E, which is a schematic view of outer diameters of each of the plastic lens elements of the imaging lens set 420 according to the 4th embodiment. As shown in FIG. 4E, in the 4th embodiment, N=5, N1=3 (those are, the first plastic lens element 421, the second plastic lens element 422 and the third plastic lens element 423), N2=2 (those are, the fourth plastic lens element 430 and the fifth plastic lens element 425), and values of the outer diameters of each of the plastic lens elements are shown below.

| 4th embodiment | | | | | |
|---|---|---|---|---|---|
| Plastic Lens Element | 421 $\psi N11$ | 422 $\psi N12$ | 423 $\psi N13$ | 430 $\psi N21$ | 425 $\psi N22$ |
| Outer Diameter (mm) | 3.3 | 3.4 | 3.5 | 5.32 | 5.52 |

The detailed optical data of the 4th embodiment are shown in Table 7 and the aspheric surface data are shown in Table 8 below.

TABLE 7

4th embodiment
f = 3.49 mm, Fno = 2.04, HFOV = 36.1 deg.

| Surface # |  | Curvature radius |  | Thickness | Material | Index | Abbe # | Focal Length |
|---|---|---|---|---|---|---|---|---|
| 0 | Object | Plano |  | Infinity |  |  |  |  |
| 1 | Ape. stop | Plano |  | −0.255 |  |  |  |  |
| 2 | Lens 1 | 1.423 | ASP | 0.587 | Plastic | 1.545 | 56.1 | 3.03 |
| 3 |  | 8.744 | ASP | 0.049 |  |  |  |  |
| 4 | Lens 2 | 8.512 | ASP | 0.220 | Plastic | 1.660 | 20.4 | −7.15 |
| 5 |  | 3.004 | ASP | 0.169 |  |  |  |  |
| 6 | Stop | Plano |  | 0.162 |  |  |  |  |
| 7 | Lens 3 | −73.466 | ASP | 0.523 | Plastic | 1.544 | 56.0 | −512.48 |
| 8 |  | −100.000 | ASP | 0.357 |  |  |  |  |
| 9 | Lens 4 | 87.853 | ASP | 0.563 | Plastic | 1.544 | 56.0 | 2.02 |
| 10 |  | −1.108 | ASP | 0.267 |  |  |  |  |
| 11 | Lens 5 | −3.067 | ASP | 0.340 | Plastic | 1.534 | 55.9 | −1.67 |
| 12 |  | 1.302 | ASP | 0.500 |  |  |  |  |
| 13 | IR-cut filter | Plano |  | 0.300 | Glass | 1.517 | 64.2 | — |
| 14 |  | Plano |  | 0.258 |  |  |  |  |
| 15 | Image Surface | Plano |  |  |  |  |  |  |

Reference wavelength is 587.6 nm (d-line).
Effective radius of Surface 6 is 0.810 mm.

TABLE 8

Aspheric Coefficients

| Surface #1 | 2 | 3 | 4 | 5 | 7 |
|---|---|---|---|---|---|
| k = | −1.8377E−01 | 2.0125E+01 | −3.7459E+00 | 2.3442E+00 | 0.0000E+00 |
| A4 = | −1.5373E−02 | −3.0395E−01 | −3.7053E−01 | −1.6078E−01 | −2.4321E−01 |
| A6 = | 1.3620E−01 | 6.8203E−01 | 1.1288E+00 | 6.6418E−01 | 3.2677E−02 |
| A8 = | −4.3499E−01 | −7.8626E−01 | −1.4182E4−00 | −9.0459E−01 | 8.4950E−02 |
| A10 = | 6.2211E−01 | 1.7994E−01 | 7.0141E−01 | 7.3394E−01 | −4.8979E−01 |
| A12 = | −3.8754E−01 | 6.4466E−02 | −4.9010E−02 | −1.8177E−01 | 4.3708E−01 |

TABLE 8-continued

| Aspheric Coefficients | | | | | |
|---|---|---|---|---|---|
| Surface # | 8 | 9 | 10 | 11 | 12 |
| k = | 0.0000E+00 | 0.0000E+00 | −8.0532E−01 | −1.9766E+01 | −7.6132E+00 |
| A4 = | −1.8813E−01 | 1.9114E−02 | 3.6682E−01 | −1.0033E−01 | −1.2934E−01 |
| A6 = | −1.5778E−02 | −9.2318E−02 | −3.8632E−01 | −1.3491E−01 | 6.7047E−02 |
| A8 = | −6.7829E−02 | 6.7191E−02 | 3.3185E−01 | 1.8696E−01 | −2.7074E−02 |
| A10 = | 1.6563E−01 | −5.6716E−02 | −1.6217E−01 | −8.5802E−02 | 7.6230E−03 |
| A12 = | −1.8519E−01 | 2.8827E−02 | 4.4494E−02 | 1.9561E−02 | −1.4189E−03 |
| A14 = | 8.8241E−02 | −5.3565E−03 | −6.4742E−03 | −2.2529E−03 | 1.5179E−04 |
| A16 = | | | 3.8861E−04 | 1.0480E−04 | −6.8293E−06 |

In the 4th embodiment, the equation of the aspheric surface profiles is the same as the equation of the 1st embodiment, so an explanation in this regard will not be provided again.

5th Embodiment

Figure 5A:
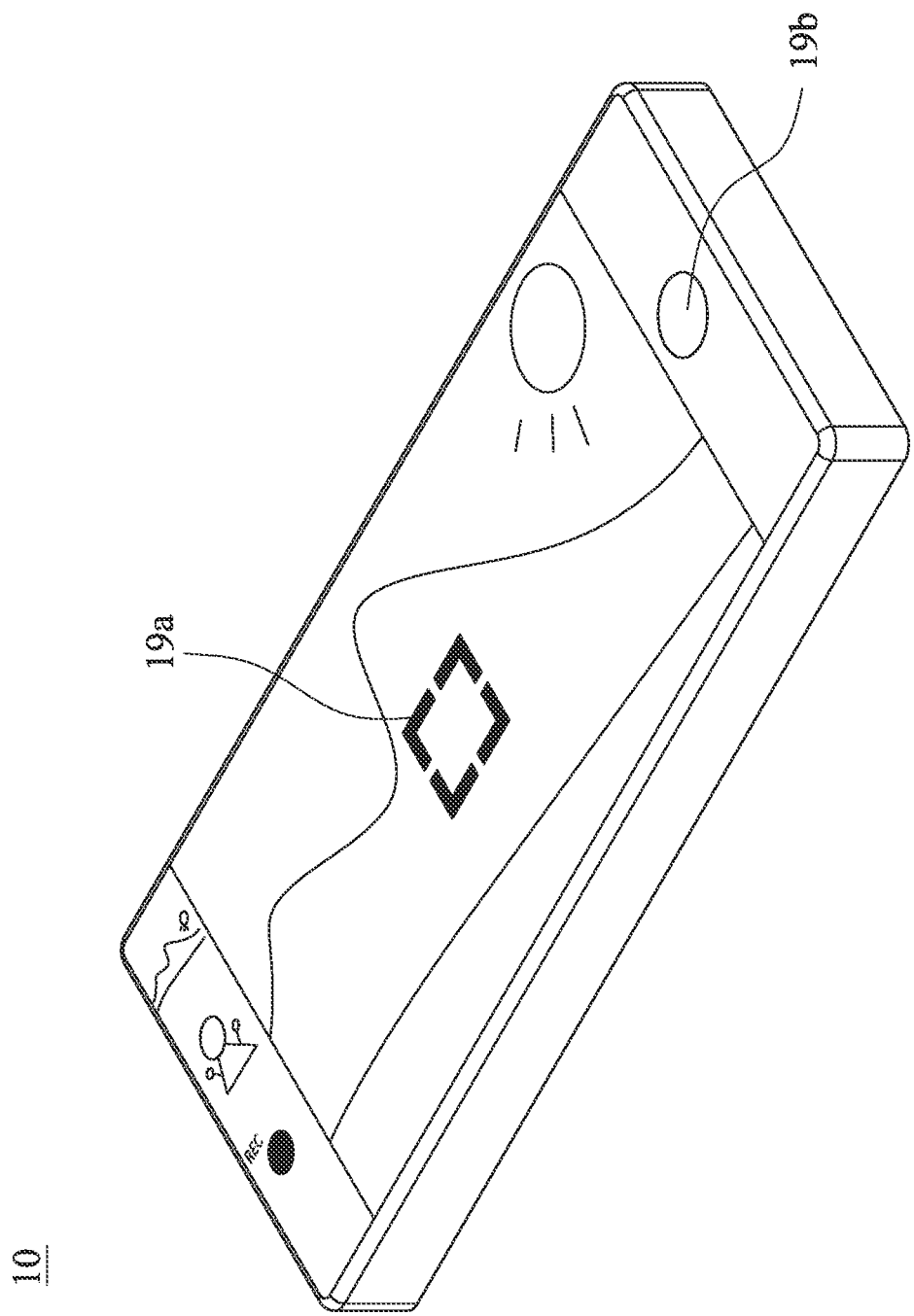
FIG. 5A is a schematic view of an electronic device according to the 5th embodiment of the present disclosure.
Figure 5B:
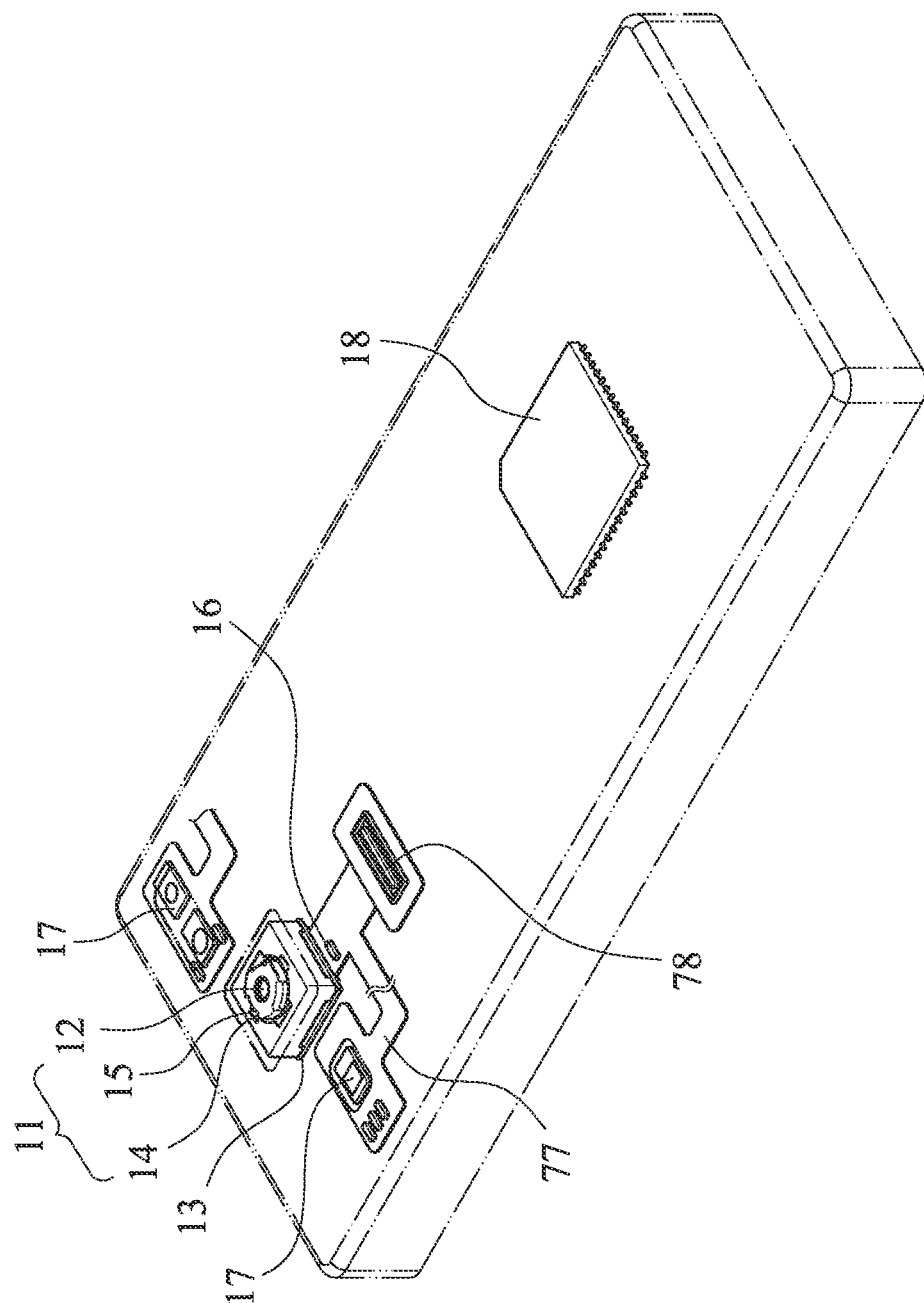
FIG. 5B is another schematic view of the electronic device according to the 5th embodiment.
Figure 5C:
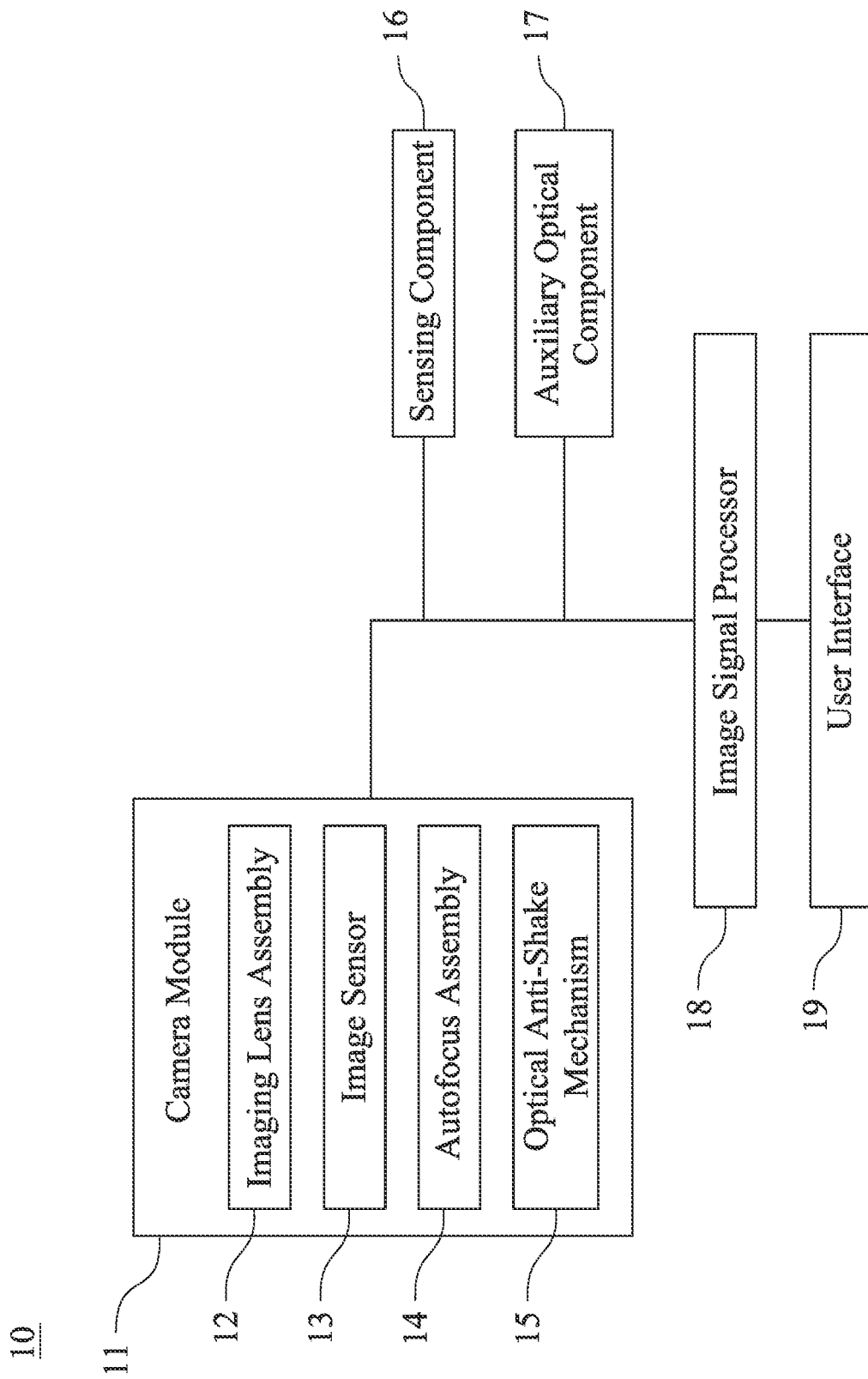
FIG. 5C is a block diagram of the electronic device according to the 5th embodiment.

FIG. 5A is a schematic view of an electronic device 10 according to the 5th embodiment of the present disclosure. FIG. 5B is another schematic view of the electronic device 10 according to the 5th embodiment. FIG. 5C is a block diagram of the electronic device 10 according to the 5th embodiment. As shown in FIG. 5A, FIG. 5B and FIG. 5C, the electronic device 10 of the 5th embodiment is a smartphone and includes a camera module 11 and an image sensor 13, and the camera module 11 includes, in order from an object side to an image side along the optical axis, an imaging lens assembly 12 according to the present disclosure and an image surface (reference number is not shown), wherein the image sensor 13 is disposed on an image surface of the camera module 11. Therefore, great image quality can be obtained, and the demand for high image specification can be satisfied.

Specifically, the user activates the capturing mode by the user interface 19 of the electronic device 10, wherein the user interface 19 of the 5th embodiment can be a touch screen 19a, a button 19b, etc. At this moment, the imaging lens assembly 12 collects imaging light on the image sensor 13 and outputs electronic signals associated with images to an image signal processor (ISP) 18.

In response to the camera specification of the electronic device 10, the camera module 11 can further include an autofocus assembly 14 and an optical anti-shake mechanism 15, and the electronic device 10 can further include at least one auxiliary optical component 17 and at least one sensing component 16. The auxiliary optical component 17 can be flash modules, infrared distance measurement components, laser focus modules and modules for compensating for color temperatures. The sensing component 16 can have functions for sensing physical momentum and kinetic energies, such as an accelerator, a gyroscope, and a hall effect element, so as to sense shaking or jitters applied by hands of the user or external environments, thus the autofocus assembly 14 and the optical anti-shake mechanism 15 disposed on the camera module 11 can function to obtain great image quality and facilitate the electronic device 10 according to the present disclosure to have a capturing function with multiple modes, such as taking optimized selfies, high dynamic range (HDR) with a low light source, 4K resolution recording, etc. Furthermore, the user can visually see the captured image of the camera through the touch screen 19a and manually operate the view finding range on the touch screen 19a to achieve the auto focus function of what you see is what you get.

Furthermore, as shown in FIG. 5B, the camera module 11, the image sensor 16 and the auxiliary optical component 17 can be disposed on a flexible printed circuit board (FPC) 77 and electrically connected with the associated elements, such as an image signal processor by a connector 78 so as to perform a capturing process. Because the current electronic devices, such as smart phone, have a tendency of being light and thin, the way of disposing the camera module and related elements on the flexible printed circuit board and then integrating the circuit into the main board of the electronic device via the connector can satisfy the mechanical design of the limited space inside the electronic device and the layout requirements, and obtain more margins. The auto focus function of the camera module can be controlled more flexibly via the touch screen of the electronic device. In the 5th embodiment, the electronic device 10 includes a plurality of image sensors 16 and a plurality of auxiliary optical components 17, and the image sensors 16 and the auxiliary optical components 17 are disposed on the flexible printed circuit board 77 and at least one other flexible printed circuit board (reference number is not shown) and electrically connected with the associated elements, such as the image signal processor 18, by corresponding connectors so as to perform a capturing process. In other embodiments (not shown), the image sensor and the auxiliary optical component can also be disposed on the main board of the electronic device or carrier boards in other forms according to requirements of the mechanical design and the circuit layout.

Moreover, the electronic device 10 can further include, but not be limited to, a wireless communication unit, a control unit, a storage unit), a random-access memory (RAM), a read-only memory (ROM), or the combination thereof.

6th Embodiment

Figure 6:
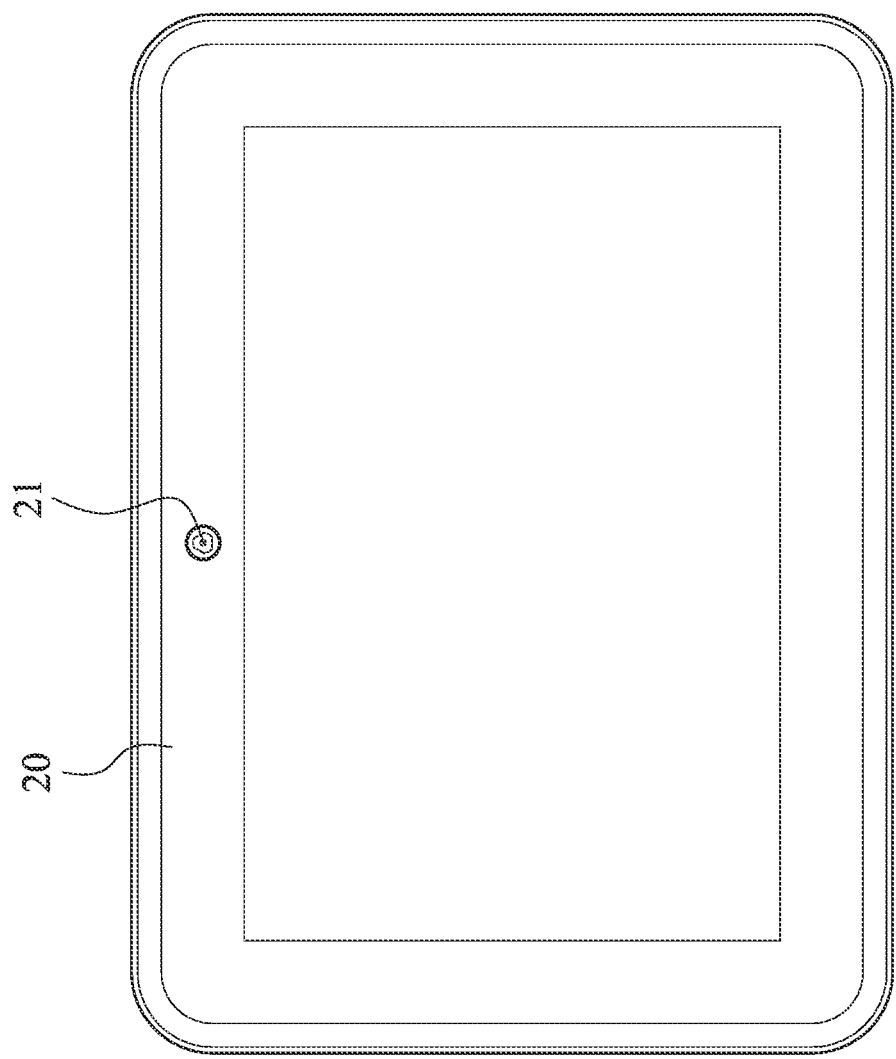
FIG. 6 is a schematic view of an electronic device according to the 6th embodiment of the present disclosure.

FIG. 6 is a schematic view of an electronic device 20 according to the 6th embodiment of the present disclosure. The electronic device 20 of the 6th embodiment is a tablet, and the electronic device 20 includes a camera module 21 according the present disclosure.

7th Embodiment

Figure 7:
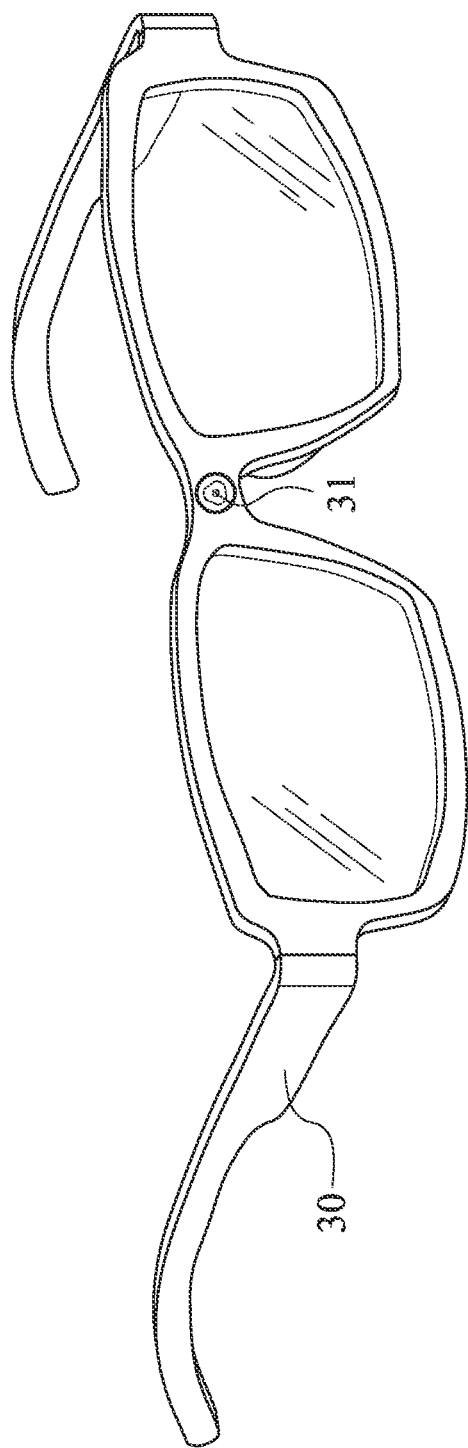
FIG. 7 is a schematic view of an electronic device according to the 7th embodiment of the present disclosure.
Figure 8A:
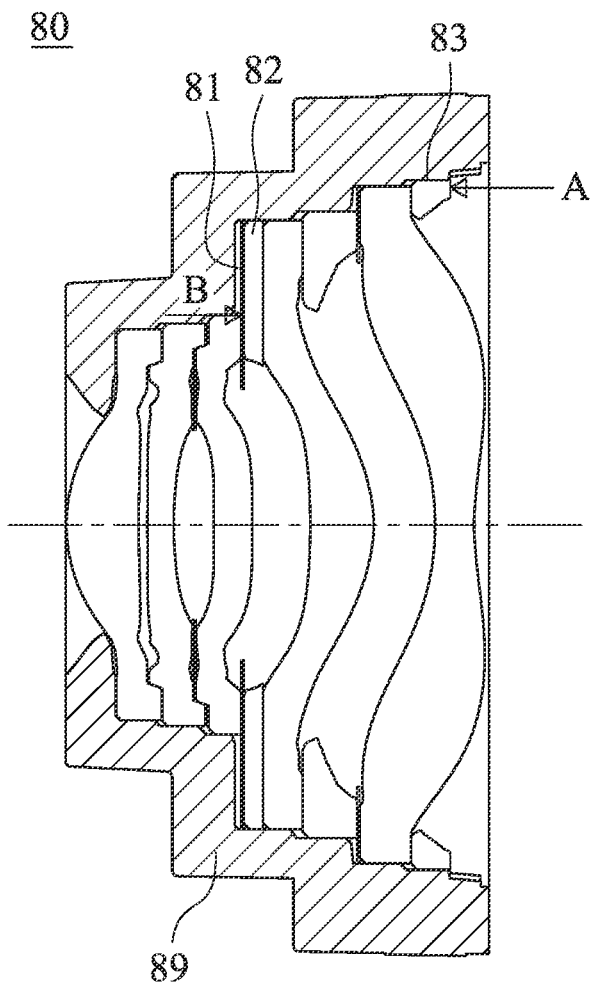
FIG. 8A is a schematic view of a conventional imaging lens assembly.
Figure 8C:
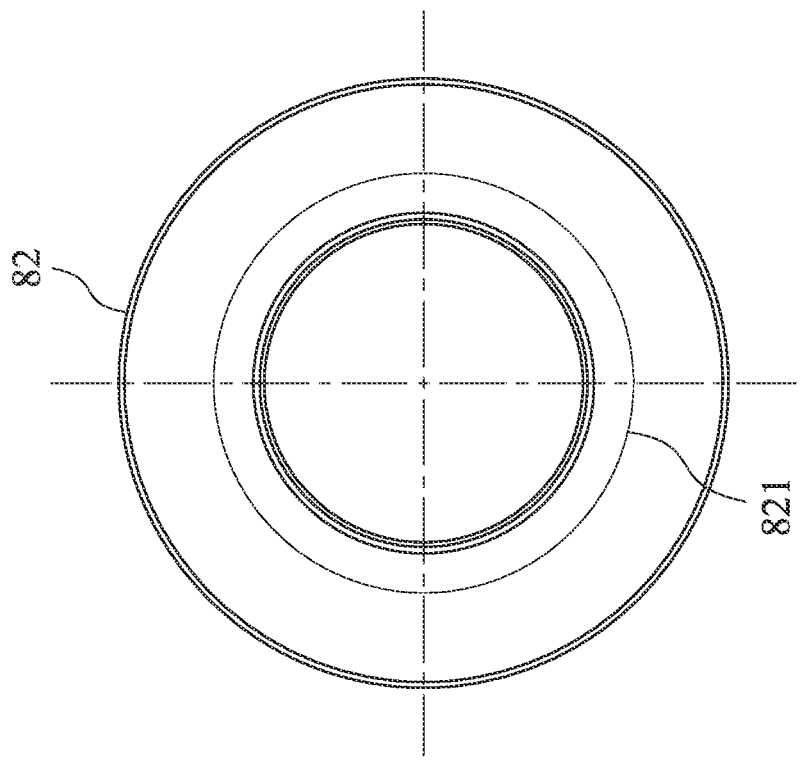
FIG. 8C is a schematic view of a spacer of the imaging lens assembly of FIG. 8A.
Figure 8B:
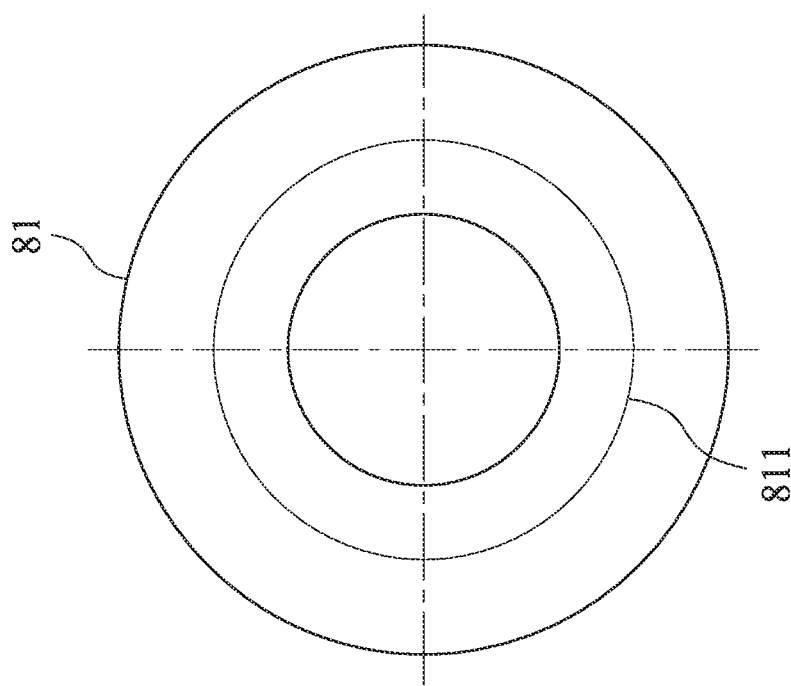
FIG. 8B is a schematic view of a light blocking sheet of the imaging lens assembly of FIG. 8A.

FIG. 7 is a schematic view of an electronic device 30 according to the 7th embodiment of the present disclosure. The electronic device 30 of the 7th embodiment is a wearable device, and the electronic device 30 includes a camera module 31 according to the present disclosure.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens assembly, comprising:
a plastic barrel, comprising:
an object-side aperture; and
a first annular surface formed in the plastic barrel and surrounding the object-side aperture; and
an imaging lens set disposed in the plastic barrel and having an optical axis, and the imaging lens set comprising a plurality of optical elements, wherein at least one of the optical elements is a plastic lens element, and the plastic lens element comprises:
an effective optical portion;
a peripheral portion formed around the effective optical portion;
a second annular surface formed on an object-side surface of the plastic lens element and surrounding the effective optical portion; and
an object-side connecting surface formed on the object-side surface of the plastic lens element and surrounding the effective optical portion, and the object-side connecting surface connected with one of the optical elements disposed on an object side of the plastic lens element, wherein the object-side connecting surface is closer to the effective optical portion than the second annular surface thereto;
wherein, the first annular surface and the second annular surface are parallel to each other;
wherein, the plastic lens element further comprises:
an image-side connecting surface formed on an image-side surface of the plastic lens element and surrounding the effective optical portion, the image-side connecting surface connected with another of the optical elements disposed on an image side of the plastic lens element;
wherein, the object-side connecting surface is disposed on an object side of the first annular surface, a distance parallel to the optical axis between the object-side connecting surface and the first annular surface is AT1, a distance parallel to the optical axis between the image-side connecting surface and the first annular surface is AT2, and the following conditions are satisfied:

$-0.60 < AT1/AT2 < 0.0$; and $-0.40$ mm $< AT1 < 0$ mm.

2. The imaging lens assembly of claim 1, wherein an air space is disposed between the first annular surface and the second annular surface.

3. The imaging lens assembly of claim 2, wherein a length of the air space between the first annular surface and the second annular surface is d, and the following condition is satisfied:

$0.001$ mm $< d < 0.08$ mm.

4. The imaging lens assembly of claim 2, wherein the distance parallel to the optical axis between the object-side connecting surface and the first annular surface is AT1, the distance parallel to the optical axis between the image-side connecting surface and the first annular surface is AT2, and the following condition is satisfied:

$2|AT1| < AT2$.

5. The imaging lens assembly of claim 1, wherein the object-side connecting surface and the image-side connecting surface are parallel to each other, and both of the object-side connecting surface and the image-side connecting surface are perpendicular to the optical axis.

6. The imaging lens assembly of claim 2, wherein a mucilage material is applied between the first annular surface and the second annular surface.

7. The imaging lens assembly of claim 2, wherein at least one of the first annular surface and the second annular surface is an annular stepped surface arranged along a direction perpendicular to the optical axis.

8. The imaging lens assembly of claim 7, wherein a mucilage material is applied between the first annular surface and the second annular surface.

9. The imaging lens assembly of claim 1, wherein a central thickness of the plastic lens element is CT, the distance parallel to the optical axis between the image-side connecting surface and the first annular surface is AT2, and the following condition is satisfied:

$0.4 < AT2/CT < 2.0$.

10. The imaging lens assembly of claim 9, wherein the central thickness of the plastic lens element is CT, the distance parallel to the optical axis between the image-side connecting surface and the first annular surface is AT2, and the following condition is satisfied:

$0.5 < AT2/CT < 1.6$.

11. The imaging lens assembly of claim 3, wherein a length of the first annular surface perpendicular to the optical axis is S1, a length of the second annular surface perpendicular to the optical axis is S2, and the following condition is satisfied:

$70\% < (S1/S2) \times 100\% < 200\%$.

12. A camera module, comprising:
the imaging lens assembly of claim 1.

13. The camera module of claim 12, wherein the object-side aperture is an aperture stop of the imaging lens assembly.

14. An electronic device, comprising:
the camera module of claim 12; and
an image sensor disposed on an image surface of the camera module.

* * * * *